June 2, 1936. K. ENGEL 2,042,518
METHOD OF AND MACHINE FOR USE IN MANUFACTURING BOOTS AND SHOES
Filed Jan. 30, 1934 11 Sheets-Sheet 1

INVENTOR
Karl Engel
By his Attorney
Victor Cobb

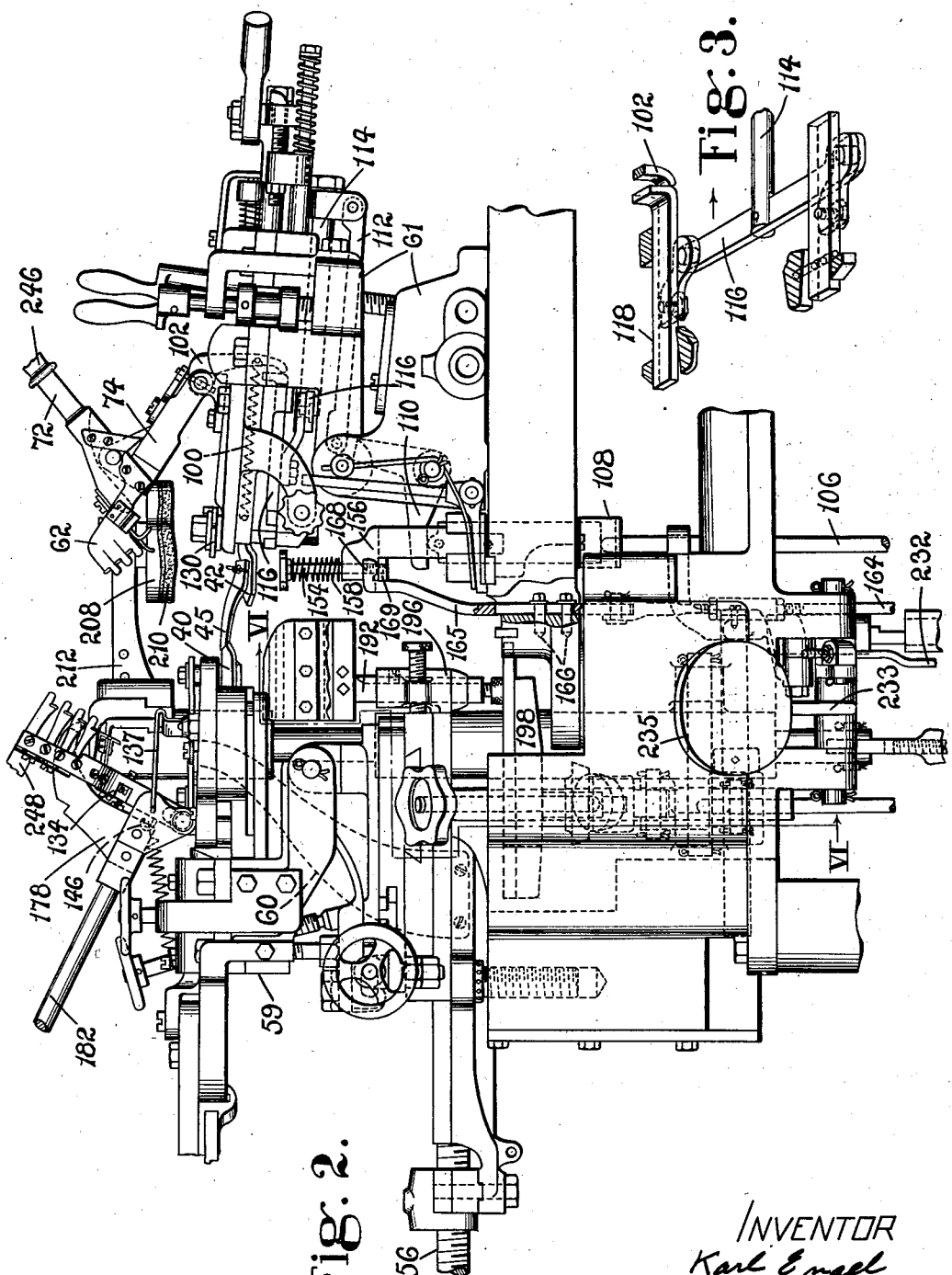

June 2, 1936. K. ENGEL 2,042,518
METHOD OF AND MACHINE FOR USE IN MANUFACTURING BOOTS AND SHOES
Filed Jan. 30, 1934 11 Sheets-Sheet 3
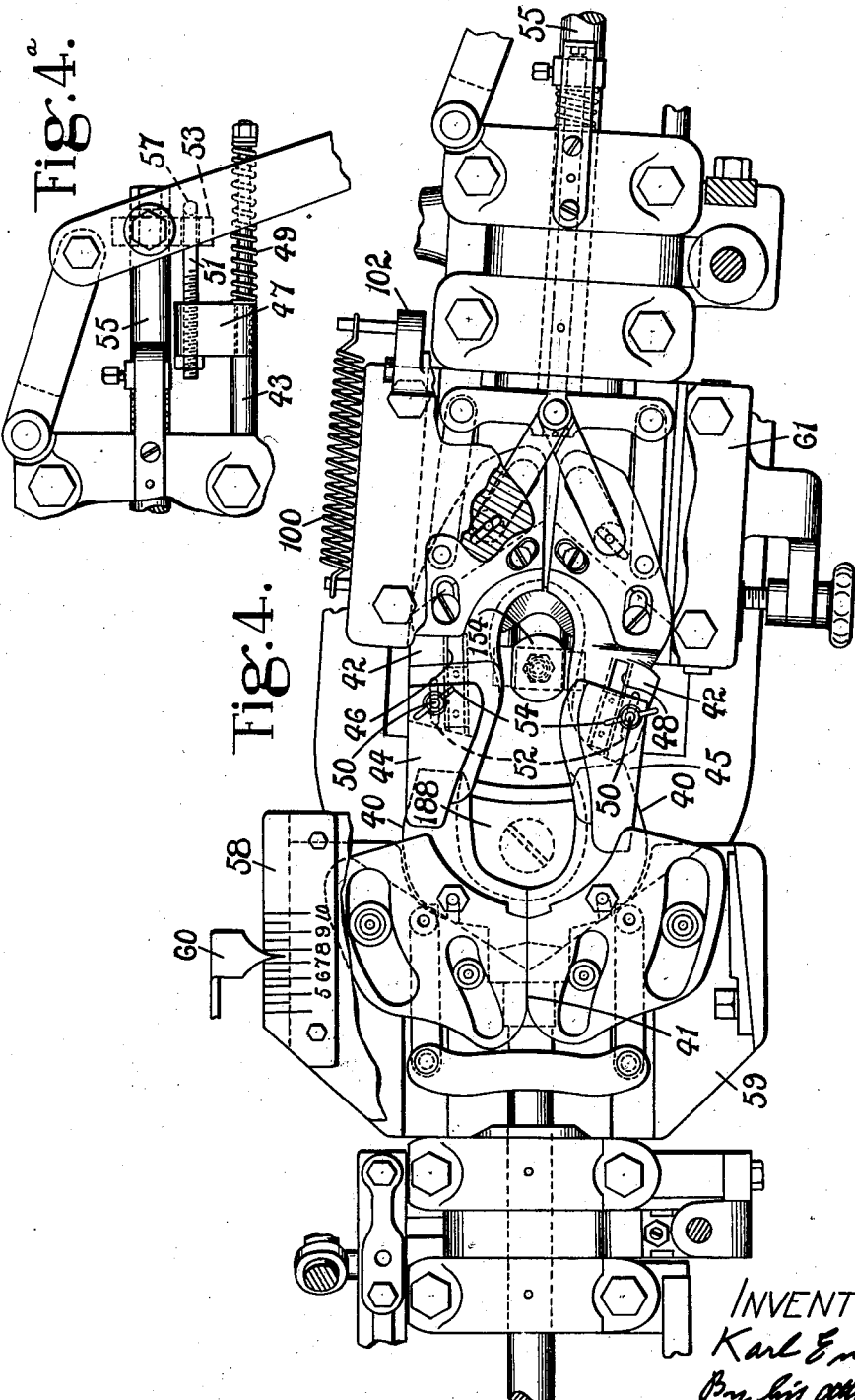

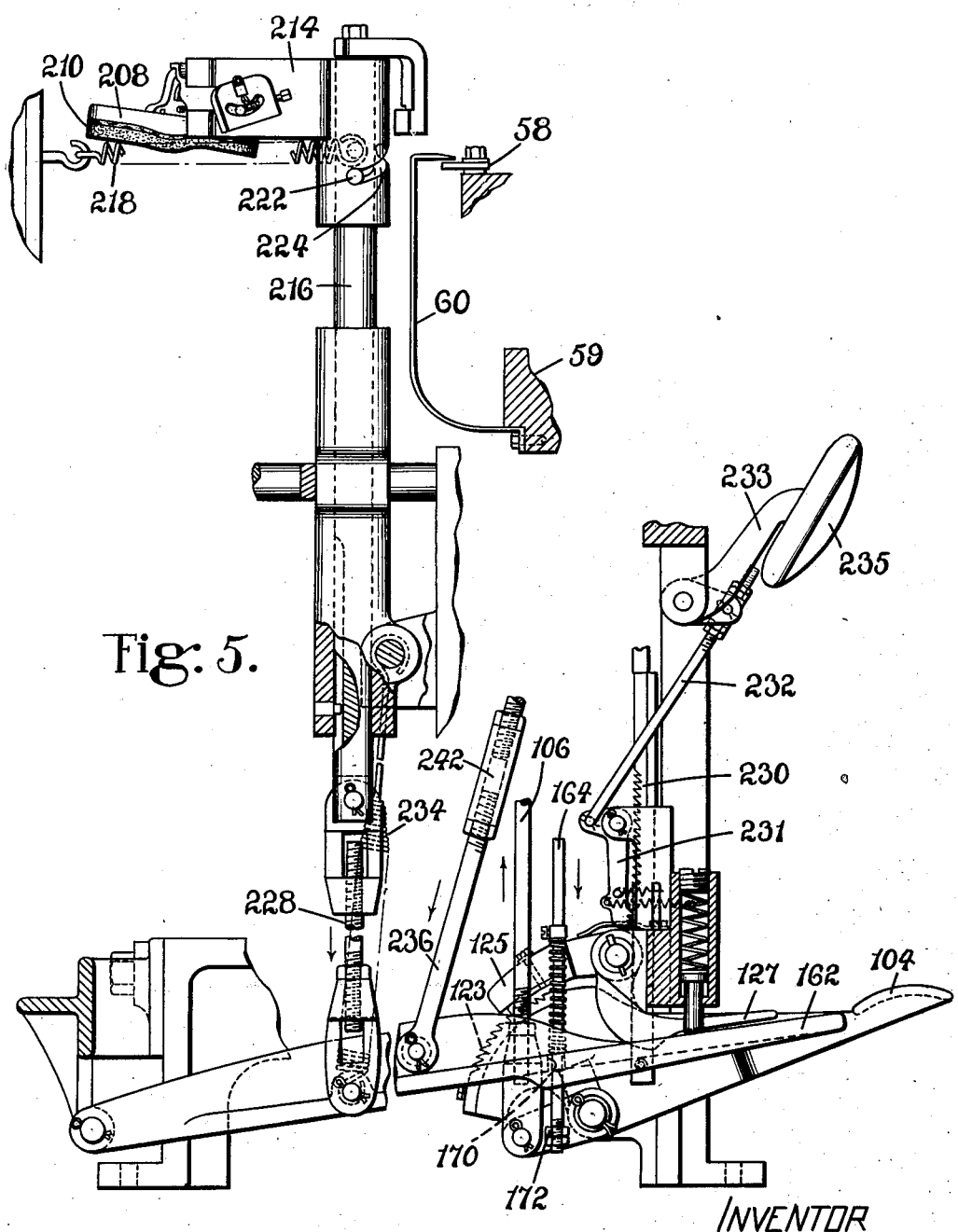

June 2, 1936.　　　　K. ENGEL　　　　2,042,518
METHOD OF AND MACHINE FOR USE IN MANUFACTURING BOOTS AND SHOES
Filed Jan. 30, 1934　　11 Sheets-Sheet 5
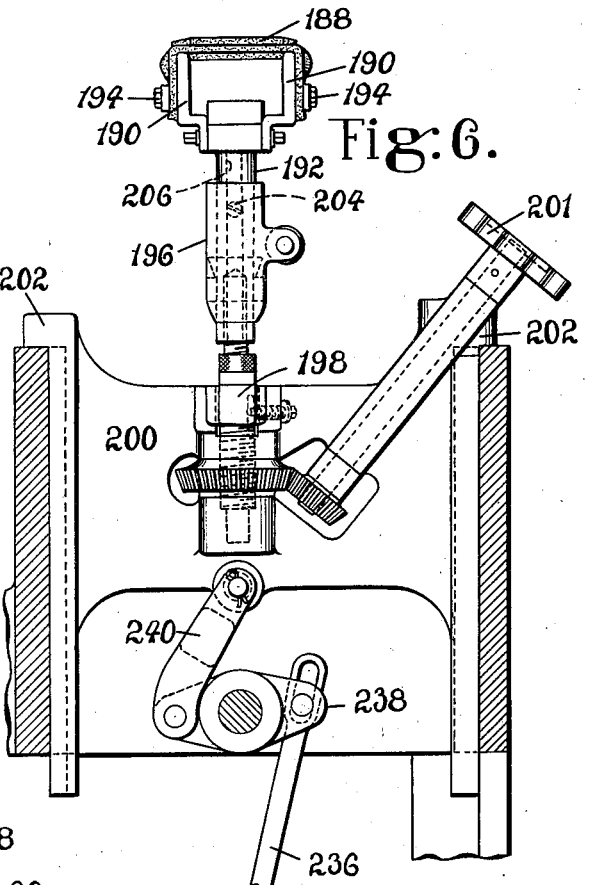
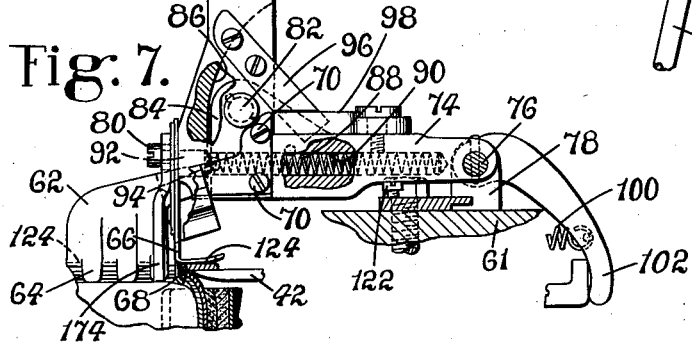
INVENTOR
Karl Engel
By his Attorney
Victor Cobb June 2, 1936.　　　　K. ENGEL　　　　2,042,518
METHOD OF AND MACHINE FOR USE IN MANUFACTURING BOOTS AND SHOES
Filed Jan. 30, 1934　　　11 Sheets-Sheet 6
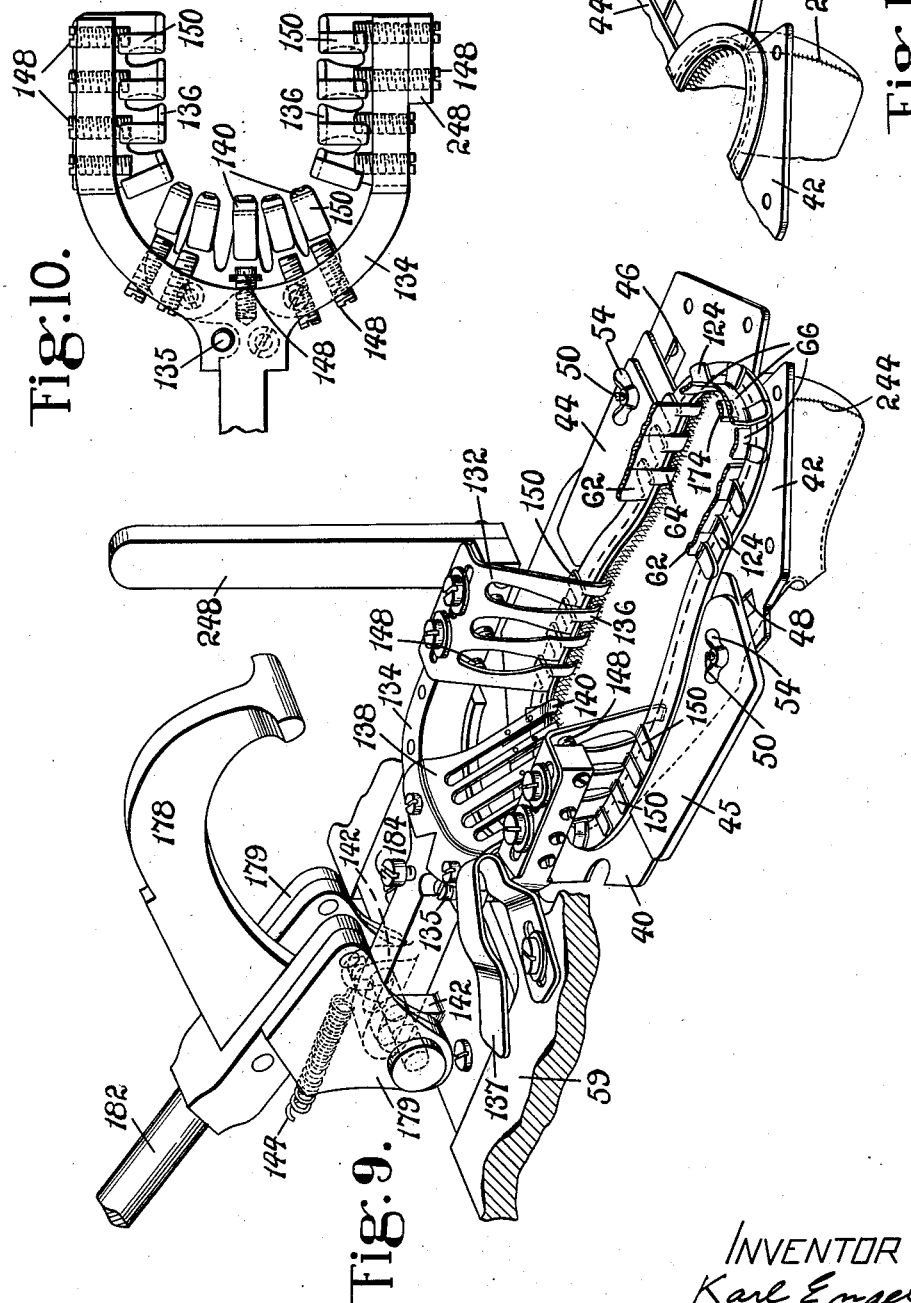
INVENTOR
Karl Engel
By his attorney
Victor Cobb June 2, 1936.    K. ENGEL    2,042,518
METHOD OF AND MACHINE FOR USE IN MANUFACTURING BOOTS AND SHOES
Filed Jan. 30, 1934    11 Sheets-Sheet 7
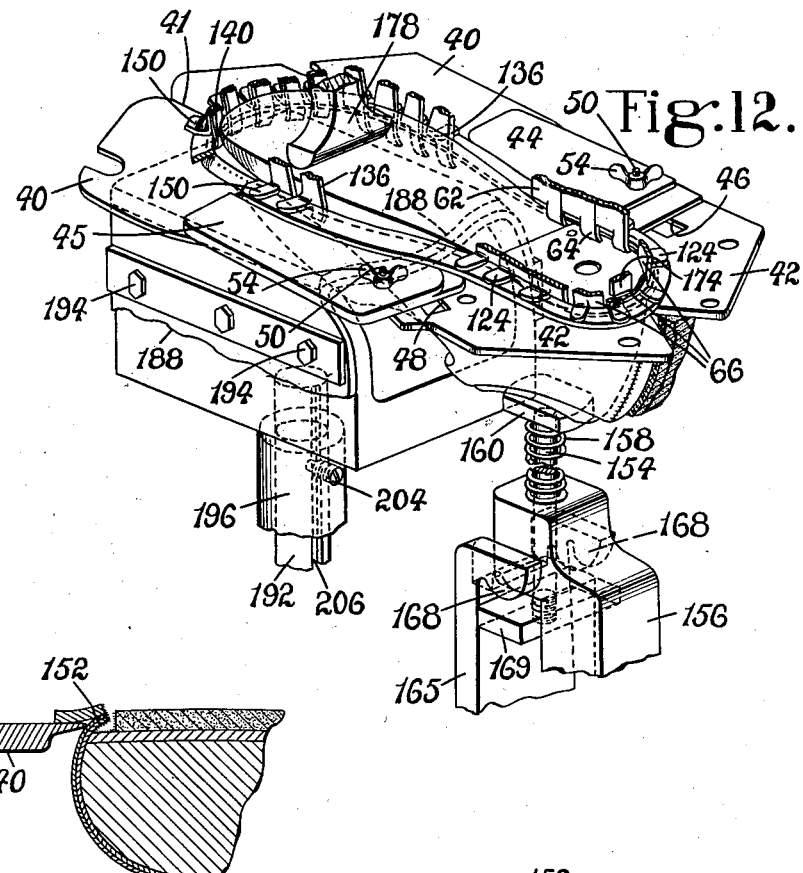
Fig. 12.
Fig. 33.
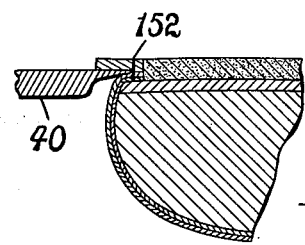
Fig. 34.
INVENTOR
Karl Engel
By his Attorney
Victor Cole June 2, 1936. K. ENGEL 2,042,518
METHOD OF AND MACHINE FOR USE IN MANUFACTURING BOOTS AND SHOES
Filed Jan. 30, 1934 11 Sheets-Sheet 8
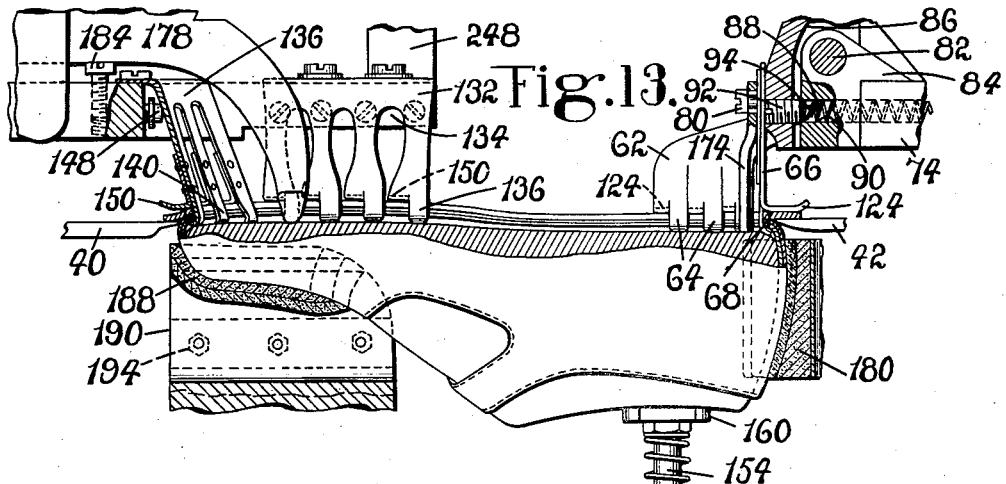
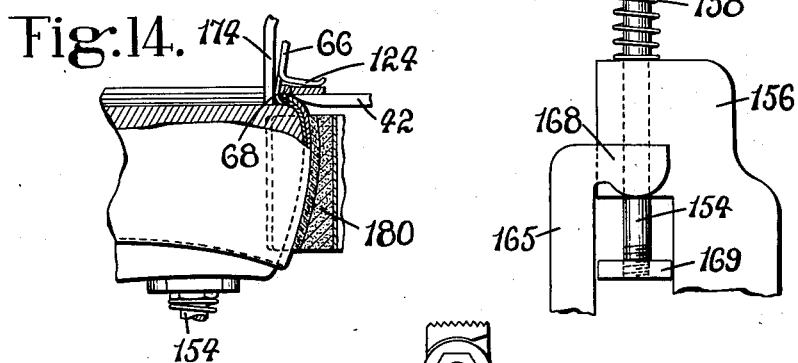
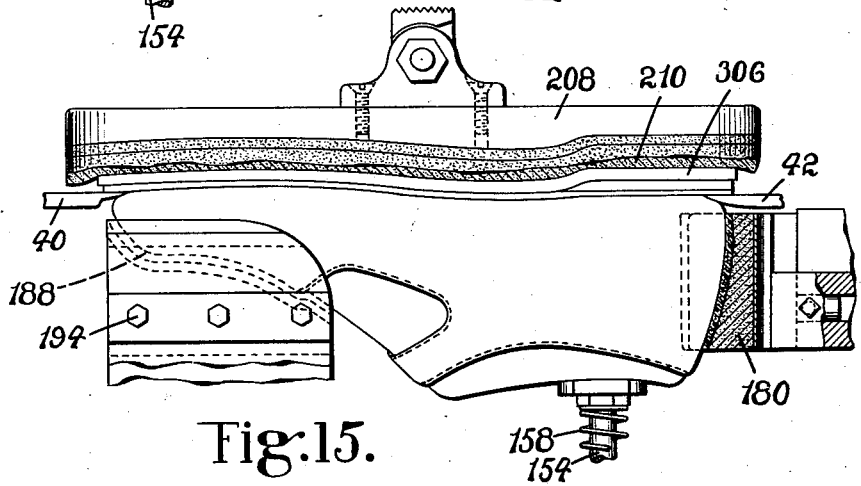
INVENTOR
Karl Engel
By his attorney
Victor Cobb

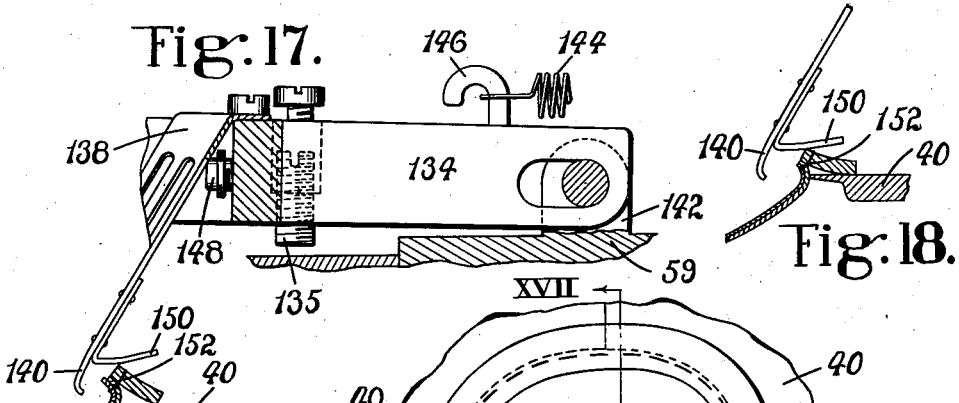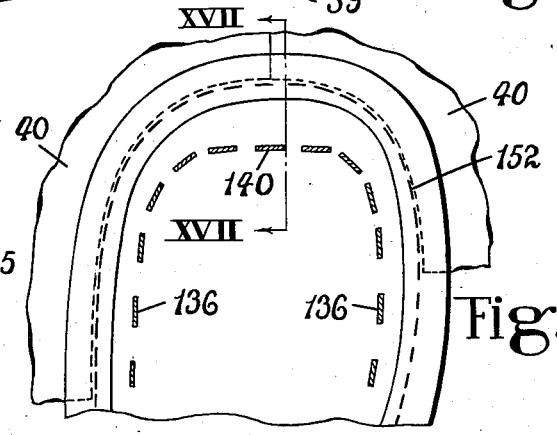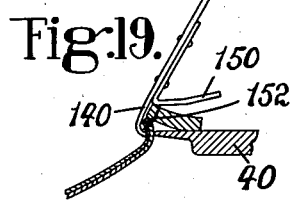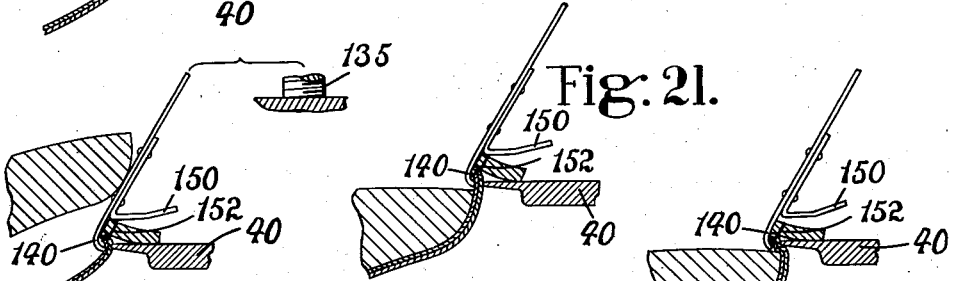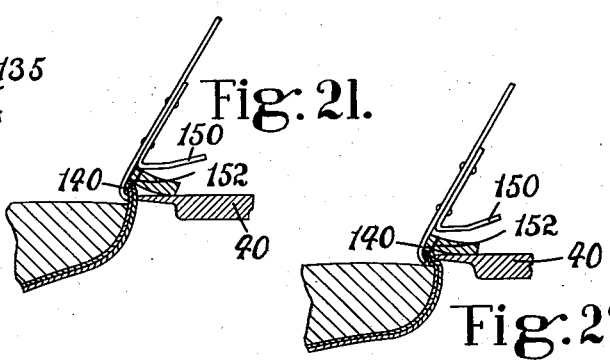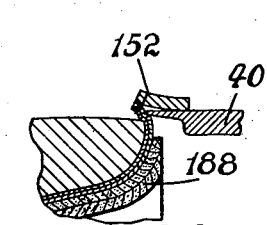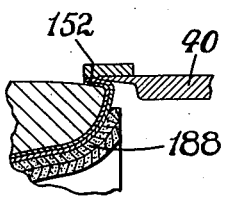

June 2, 1936.  K. ENGEL  2,042,518
METHOD OF AND MACHINE FOR USE IN MANUFACTURING BOOTS AND SHOES
Filed Jan. 30, 1934  11 Sheets-Sheet 10
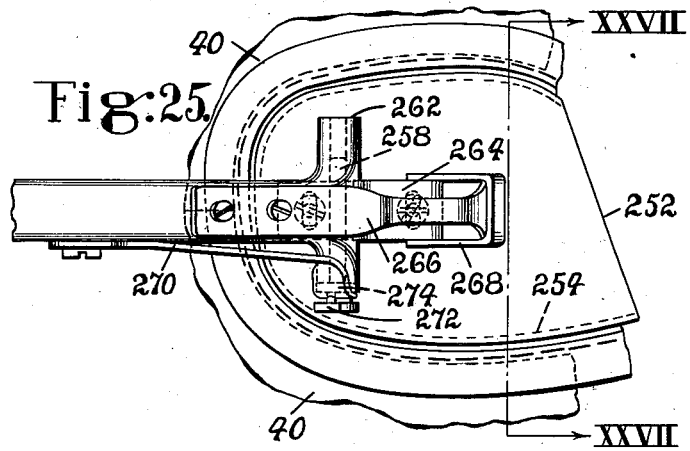
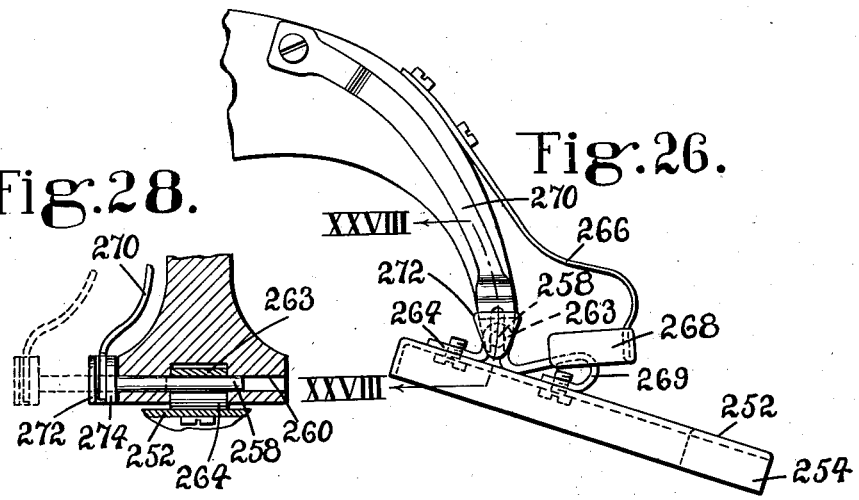
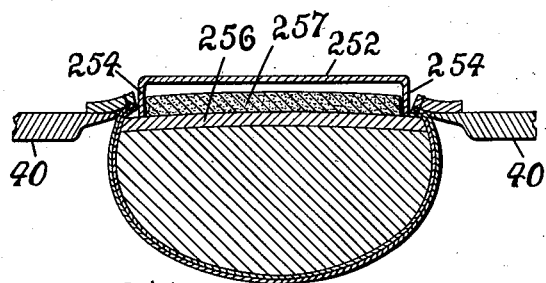
INVENTOR
Karl Engel
By his attorney
Victor Cobb June 2, 1936.  K. ENGEL  2,042,518
METHOD OF AND MACHINE FOR USE IN MANUFACTURING BOOTS AND SHOES
Filed Jan. 30, 1934  11 Sheets-Sheet 11
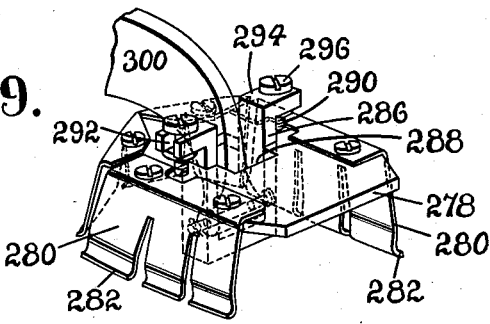
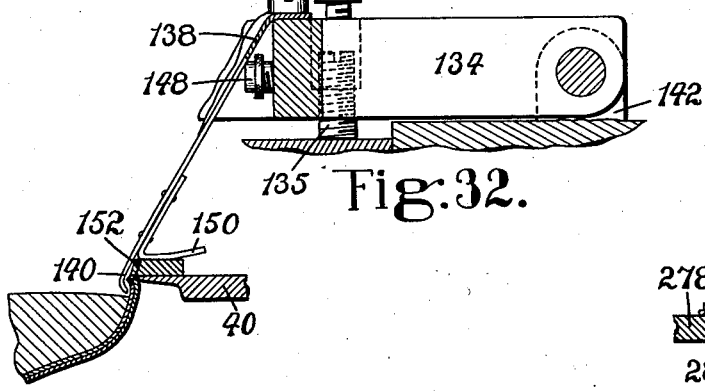
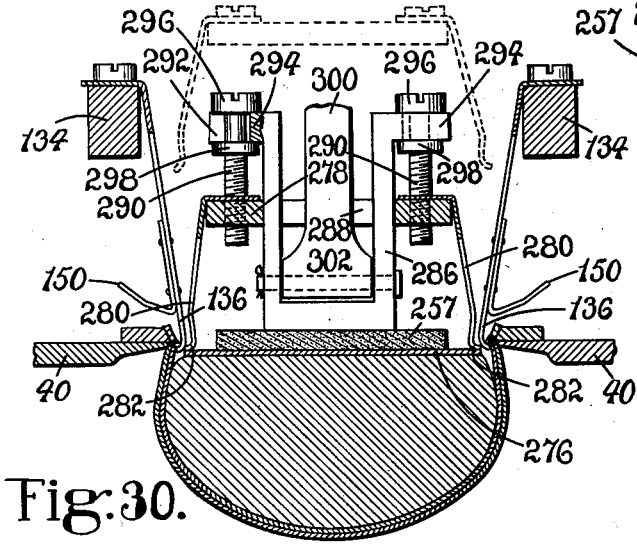
INVENTOR
Karl Engel
By his attorney
Victor Cobb Patented June 2, 1936

2,042,518

UNITED STATES PATENT OFFICE 2,042,518

METHOD OF AND MACHINE FOR USE IN MANUFACTURING BOOTS AND SHOES

Karl Engel, Lynn, Mass., assignor to United Shoe Machinery Corporation, Paterson, N. J., a corporation of New Jersey Application January 30, 1934, Serial No. 709,018

170 Claims. (Cl. 12—7)

The present invention relates to methods of and machines for use in manufacturing boots and shoes. The invention is herein illustrated in its application to the manufacture of pre-welted shoes, that is, shoes in which the welt is stitched to the upper before the upper is lasted. The invention is illustrated in its embodiment in a bed lasting machine of the type disclosed, for example, in United States Letters Patent No. 1,018,477, granted February 27, 1912, on an application of Matthias Brock.

Pre-welted shoes as heretofore manufactured have usually been lasted by hand without the aid of lasting machinery. Frequently pre-welted shoes which are lasted by hand are not accurately conformed to their lasts and they usually lack that degree of uniformity in lasting which is usual in machine-lasted shoes.

Objects of the present invention are to improve the pre-welted shoe by substituting machine methods for hand methods of manufacture in order to obtain more uniform lasting and more accurate conformity of uppers to their lasts. The substitution of machine methods for hand methods of manufacture also tends to increase production, and to reduce the cost of manufacture.

Another object of the present invention is to reorganize commercial bed lasting machines of the illustrative type in order to adapt such machines for use in the manufacture of pre-welted shoes. It is to be understood, however, that the present invention is not limited to its embodiment in bed lasting machines, the invention in certain of its aspects being applicable to other machines or to hand methods of manufacture.

In one aspect of the invention, the novel method of making shoes comprises supporting a pre-welted upper off its last in inverted position, moving the heel end of a last downwardly and rearwardly into the heel end of the upper and then moving the toe end of the last downwardly to a predetermined limit in order to position it in the toe end of the upper. Prior to the introduction of the last into the supported upper, the upper is drawn lengthwise thereof and held in drawn condition for the reception of the last. This aspect of the invention, in its application to bed lasting machines, comprises supporting a pre-welted upper by its welt upon the wipers of a bed lasting machine and drawing the upper lengthwise thereof in order to arrange the ends of the upper in position to be supported by the wipers. In its application to the illustrated embodiment of the invention, the method of drawing the supported upper lengthwise thereof for the reception of a last comprises drawing the heel end of the upper rearwardly thereof against the heel wipers of a bed lasting machine, drawing the toe end of the upper forwardly thereof against the toe wipers and holding the ends of the upper in drawn condition while a last is pressed into the upper. The upper is thus arranged in position to be supported by the wipers and the welt is prevented from being drawn downwardly off the wiper plates during the depression of the last into the upper.

The introduction of the last into the supported upper is effected by positioning the heel end of the last in the heel end of the supported upper, pressing the heel end of the last upwardly to a predetermined limit and then swinging the last in a plane extending lengthwise and heightwise thereof in order to position the toe end of the last within the upper. The toe end of the last is pressed downwardly into the upper to a predetermined limit in order to arrange the last in a predetermined heightwise relation to the supported upper. The heightwise relation of the depressed last to the supported upper is such that a measured width of the welted margin of the supported upper extends above the bottom of the depressed last thereby providing a measured width of lasting allowance to be lasted over the shoe bottom. Preferably, the forepart of the supported upper is spread to facilitate the introduction of the last, the spreading of the upper being effected by drawing the forepart widthwise thereof and holding it so drawn during the depression of the last.

The supported upper is pulled or stretched lengthwise thereof during the introduction of a last thereinto, said pulling or stretching preferably being effected by moving the last rearwardly of the supported upper during the depression of the toe end of the last into the toe end of the upper. In accordance with an aspect of the invention, the preferred method of stretching the upper lengthwise consists in holding the toe end of a pre-welted upper from movement lengthwise thereof, positioning the heel end of a last in the heel end of the upper, forcing the last rearwardly thereof in order to stretch the upper lengthwise thereof, and pressing the toe end of the last into the toe end of the upper.

After the last has been positioned within the supported upper, the wipers are advanced in order to lay the measured lasting allowance over the last bottom and in order to arrange the welt for the reception of an outsole. In accordance with another aspect of the invention, the wipers are retained in advanced position after the shoe has been lasted in order to support the welt while an outsole which has been treated with adhesive is pressed thereagainst. In order to prevent the shoe from being depressed below its lasting position during the sole laying operation with a resulting misplacement of the welt upon the wipers, or straining of the welt seam, the downward pressure of the outsole against the shoe bottom is opposed by an upward pressure of the last. Preferably, the upward pressure of the last is somewhat less than the downward pressure against the outsole in order to insure a pressure of the outsole against the welt sufficient to create an enduring bond therebetween.

It is proposed to strengthen pre-welted shoes by uniting the edge face of the filler to the adjacent edge faces of the welt and upper and, accordingly, the invention in another of its aspects comprises supporting a pre-welted upper by its welt upon the wipers of a bed lasting machine, positioning within the upper a last having a filler attached to its bottom, applying adhesive to the edge face of the filler and to the adjacent edge faces of the welt and upper, advancing the wipers in order to press the treated surfaces firmly together and holding the wipers advanced until the adhesive has created a bond between the treated surfaces. In this aspect, the invention, in its application to pre-welted shoes provided with insoles, includes the application of adhesive to the marginal surface of the insole and to the inner surface of the lasting allowance as well as to the edge face of the filler and the adjacent edge faces of the welt and upper.

Features of the invention contemplate the provision, in a machine for making pre-welted shoes, of grippers constructed and arranged to be actuated by the depression of a last into a pre-welted upper to grip the upper by its lasting allowance. In the illustrated machine the means for gripping the upper comprises wiper plates and a plurality of fingers arranged in opposition to the inner edges of the wiper plates and positioned within the upper, said fingers preferably being arranged to move heightwise of the upper to position them therein and to move outwardly of the upper in order to cause the upper to be engaged between the fingers and the wiper plates.

In order that the heightwise relation of the depressed last to the supported upper may serve to measure a width of lasting allowance, it is desirable that both the last and the upper be arranged in predetermined heightwise positions relatively to the wiper plates. There is, therefore, provided in accordance with a further feature of the invention means for positioning the upper heightwise thereof relatively to the wiper plates, said means being herein illustrated as gages constructed and arranged to engage the welt of a pre-welted upper which is supported by the wiper plates. These gages may position the welt flat against the wiper plates or they may depress it only partially, leaving it positioned at an angle to the wiper plates.

A further feature of the invention contemplates the provision, in a machine for making pre-welted shoes, of means for guiding a last during its introduction into an upper comprising guides constructed and arranged to engage the side and end portions of the forepart of the last. Preferably, the free ends of the guides are positioned within the forepart of the upper and arranged to be brought into engagement therewith. In order that the side portions of the forepart of the supported upper may offer no obstruction to the introduction of a last into the upper, a plurality of fingers are constructed and arranged for engagement with the inner surface of a pre-welted upper and arranged to be actuated to spread the upper for the reception of a last. In the illustrated machine the spreading of the forepart of the upper is effected by a movement widthwise of the upper of the last guiding fingers which engage the side portions of the forepart of the last. Preferably the upper spreading movement of said fingers is effected by the engagement of the forepart of the last therewith in the course of its depression into the supported upper. In the illustrated machine the upper spreading fingers are the means which cooperate with the wiper plates to grip the lasting allowance at opposite sides of the forepart of the upper and said fingers are also the means for guiding the last during its introduction into the supported upper. It is to be understood, however, that the present invention is not limited to a single series of fingers for guiding the last, spreading the forepart of the upper, and clamping the lasting allowance against the wiper plates, the employment of a separate series of fingers for any or all of these operations being within the scope of the present invention.

The depression of the last into the supported upper may be effected by a depressor such, for example, as that shown and described in my co-pending application Serial No. 656,494, filed February 13, 1933, for Methods of and machines for lasting shoe uppers. This type of depressor bears against a filler mounted on the last bottom (or against the last itself if there is no filler on the last bottom) at a point near the center of the forepart but does not engage the marginal portion of the last. For the depression into a supported upper of a last having an insole mounted on its bottom, the present invention contemplates the provision of a depressor constructed and arranged to apply pressure locally to the margin of the insole. As herein illustrated, the depressor consists of an arm having pivoted thereto either of two alternative pressers, one of which is illustrated as a plate provided with a downwardly extending flange arranged to engage the margin of the insole and the other of which is illustrated as a series of fingers constructed and arranged to engage the margin of the insole.

These and other aspects and features of the invention will appear more clearly from the following description when read in connection with the accompanying drawings and will be pointed out in the appended claims.

In the drawings,

Fig. 2 is a broken side elevation;

Fig. 3 is a detail perspective view of parts in the heel head partly shown in Fig. 2;

Fig. 4 is a broken plan view showing the wiper plates arranged for the reception of a pre-welted upper;

Fig. 4a is a fragmentary plan view illustrating certain novel features of the heel wiper actuating mechanism;

Fig. 5 is a detail view partly in section illustrating particularly the treadles and their connections and also the sole laying mechanism;

Fig. 6 is a sectional elevation of the toe supporting mechanism taken substantially on the line VI—VI of Fig. 2;

Fig. 7 is a detail view, partly in section, illustrating the means for holding the heel end of the upper for the reception of a last;

Fig. 8 is a detail, partly in section, illustrating in plan the mechanism shown in Fig. 7;

Fig. 9 is a detail perspective view illustrating one form of last depressor and the means for holding the upper for the reception of a last;

Fig. 10 is a detail view of the finger assembly carried by the toe head looking upward from beneath it;

Fig. 11 is a fragmentary detail of the heel end of a pre-welted upper supported upon the heel wiper plates;

Fig. 12 is a perspective view showing a supported upper with a last partially depressed thereinto;

Fig. 13 is a side elevation, partly in section, illustrating a supported upper with a last completely depressed thereinto;

Fig. 14 is a detail, partly in section, showing the heel end of a supported upper with a last positioned therein and the heel wipers partially advanced from their position in Fig. 13;

Fig. 15 is a side elevation, partly in section, illustrating a lasted upper with an outsole mounted thereon and a sole laying pad pressed against it;

Fig. 16 is a detail plan view of the forepart of a supported upper illustrating diagrammatically the arrangement of the finger assembly prior to the introduction of the last;

Fig. 17 is a longitudinal sectional view taken substantially on the line XVII—XVII of Fig. 16 illustrating, in addition to the showing of Fig. 16, the finger carrying means;

Figure 1:
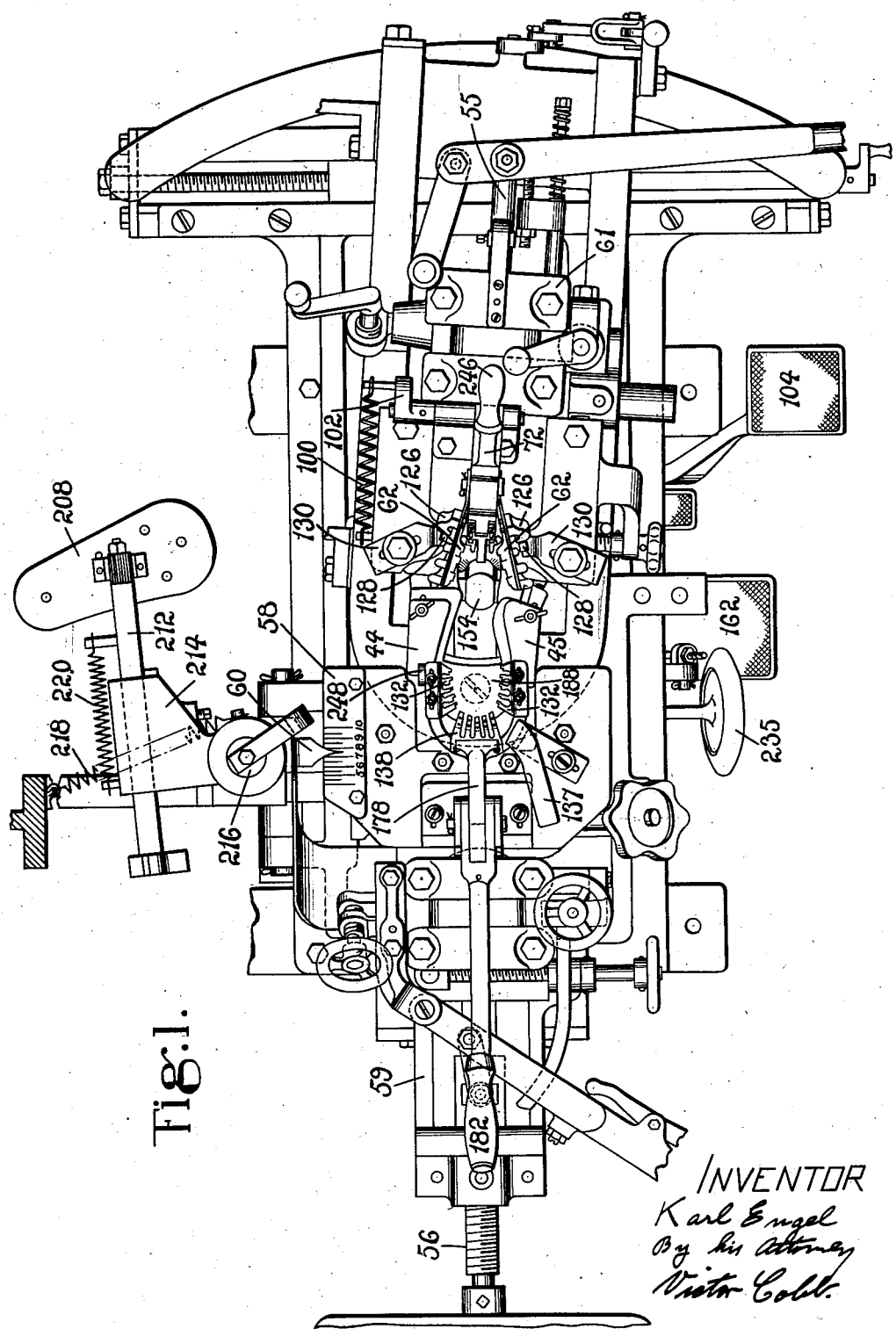
Fig. 1 is a plan view of a bed lasting machine embodying the features of the present invention.

Figs. 18 to 24 inclusive are detail sectional views, all in the same plane as Fig. 17, illustrating progressive stages in the shoemaking operation;

Fig. 25 is a detail plan view of a last depressing means which may be employed when the last has an insole positioned on its bottom;

Fig. 26 is a detail in side elevation of the last depressing means illustrated in Fig. 25;

Fig. 27 is a sectional view taken substantially on the line XXVII—XXVII of Fig. 25;

Fig. 28 is a sectional view taken substantially on the line XXVIII—XXVIII of Fig. 26;

Fig. 29 is a perspective view of an alternative last depressing means;

Fig. 30 is a transverse vertical section through the forepart of a supported upper showing a last depressed thereinto and held in depressed position by the depressing means of Fig. 29, an intermediate position of said depressing means being indicated in dotted lines;

Fig. 31 is a detail sectional view similar to Fig. 30 showing the position of the parts after the toe wiper plates have been advanced to the edge of the insole;

Fig. 32 is a longitudinal vertical section through the center of the toe end of a supported upper illustrating particularly a finger carrier alternative to the finger carrier illustrated in Fig. 17;

Fig. 33 is a detail vertical transverse section though the forepart of a supported upper and a depressed last showing the parts in their positions just prior to the final advance of the wipers, an insole and filler being positioned on the last bottom, and the juxtaposed surfaces of the welt and upper and the insole and filler having been coated with adhesive, and Fig. 34 is a view similar to Fig. 33 showing the parts in their positions after the toe wiper plates have been fully advanced and the juxtaposed surfaces brought together.

In common with prior machines of the illustrative type, the machine of the present invention is provided with toe wiper plates 40 and heel wiper plates 42. In the illustrated machine, the wiper plates not only perform their usual function of overwiping the lasting allowance, but also serve to support a pre-welted upper by its welt. Cooperating with the toe and heel wipers there is provided in the illustrated machine a pair of shank wiper plates 44 and 45 (Fig. 4) which bridge the space, at each side of a supported upper, between the toe and heel wiper plates. The toe, heel and shank wipers together form a continuous upper supporting surface when the toe head 59 and the heel head 61 are in the proper relative adjustment to position the shank wipers in alinement with the toe wipers and when the toe wipers and heel wipers are arranged as illustrated in Fig. 4. In this position the toe wipers are at the limit of their retraction, that limit being determined by the interengagement of the side edge faces 41 of the toe wiper plates (Fig. 12). The position of the heel wipers 42, as shown in Fig. 4, and hereinafter referred to as their normal retracted position, is determined by mechanism which operates yieldingly to limit further retraction of the wipers. The yield in said mechanism permits a further retraction of the heel wipers from their normal retracted position in order to facilitate the admission of a last into the supported upper and also to permit easy removal of the shoe at the end of the cycle of operations. As illustrated, said mechanism consists of a rod 43 (Fig. 4a) extending rearwardly from the heel head, said rod being provided with a base portion of greater diameter than its end portion. Slidably mounted upon the end portion of the rod 43 is a slide 47 which is normally held in engagement with the base portion of the rod 43 by a spring 49 coiled about the end portion of the rod 43 and confined between the slide 47 and a nut on the threaded end of the rod 43. A screw-threaded pin 51 is threaded into a tapped hole in the slide and arranged to extend through a hole in an arm 53 secured to a wiper actuating rod 55. The end of the pin 51 which extends beyond the arm 53 is bent to form a hook 57. The hook 57 yieldingly limits the rearward movement of the arm 53 and consequently it also provides a yielding limit for the rearward movement of the wiper actuating rod 55 to which the arm is secured. By adjusting the pin 51 relatively to the slide 47, the normal retracted position of the heel wipers, as determined by the mechanism above described, may be varied in order to provide a normal spacing of the heel wipers transversely thereof suitable for the reception of uppers of a given size. The shank wiper plates 44 and 45 are mounted upon the heel wiper plates 42 and preferably overlie the toe wiper plates 40. It is desirable that the shank wipers in their normal retracted position be arranged with their wiping edges substantially in alinement with the wiping edges of the retracted toe wiper plates, as illustrated in Fig. 4. It is apparent that the adjustment of the heel wipers above described causes a movement of the shank wipers transversely thereof out of alinement with the toe wipers and consequently for each adjustment of the heel wipers transversely thereof there must be a like transverse adjustment of the shank wipers in order to return them to their position of alinement relatively to the toe wipers. For each adjustment of the heel wipers transversely thereof to accommodate different sizes of uppers there must, of course, be an adjustment of the shank wipers lengthwise of the wiper assembly in order to bring the shank wipers into operative relation to the shank portion of a supported upper. In the illustrated machine the lengthwise adjustment of the shank wiper plates and the transverse adjustment thereof above referred to is effected by a single adjustive movement of each of the wiper plates in a path extending forwardly of the wiper assembly in convergent relation to the longitudinal median line of a supported upper. In order to provide such adjustive movement of the shank wiper plates, said plates have tongue and groove connections with the heel wiper plates 42, which connections determine the direction of said adjustive movement. As illustrated in Fig. 4, the wiper plate 45 extends farther toward the toe end of the wiper assembly than does the opposite wiper plate and it is therefore apparent that the transverse misplacement of the forward end of the wiper plate 45 incidental to the transverse adjustment of the heel wiper plates is greater than such misplacement of the wiper plate 44 and consequently the transverse adjustment of the wiper plate 45 is proportionally greater than the transverse adjustment of the wiper plate 44. Accordingly, the degree of convergence of the path of adjustive movement of the shank wiper plate 45 relatively to the longitudinal median line of a supported upper is greater than the degree of convergence of the path of adjustive movement of the shank wiper plate 44 relatively to said longitudinal median line. In the illustrated wiper assembly, the direction of adjustive movement of the shank wiper plate 44, which engages the outer portion of the shank of a left shoe, is controlled by a dovetail groove 46 in the underlying heel wiper plate 42, within which groove there is slidably mounted a suitable tongue extending downwardly from the shank wiper plate 44. Similarly, the direction of adjustive movement of the shank wiper plate 45 which engages the inside of the shank is controlled by a dovetail groove 48 in the underlying heel wiper plate, within which groove there is slidably mounted a suitable tongue extending downwardly from the shank wiper plate 45. Each of the grooves 46 and 48 converges, forwardly of the wiper assembly, relatively to the longitudinal median line of a supported upper, the degree of convergence of the groove 48 being somewhat greater than the degree of convergence of the groove 46, the difference between the degrees of convergence of said grooves being substantially proportional to the difference in distance traveled by the forward ends of the shank wiper plates incidental to the above-described transverse adjustment of the heel wiper plates for different sizes of shoes. In order to clamp the shank wiper plates 44 and 45 in adjusted position, there is provided for each of said wiper plates a clamping bolt 50 which is arranged to extend upwardly through a slot 52 in the heel wiper plate, said slot being paralled to the groove. Threaded to the clamping bolt 50 is a wing nut 54 which cooperates with the bolt 50 to clamp the shank wiper plate to the heel wiper plate.

As usual in machines of the illustrative type, the toe wiper assembly is adjustable, lengthwise of a supported upper, relatively to the heel head by means of a hand screw 56. In order that the lengthwise adjustment of the toe head may be effected with ease and certainty prior to the positioning of an upper upon the wiper plates, there is provided in the illustrated machine a scale 58 (Fig. 1) which is secured to a portion of the toe head which moves with the toe wiper assembly during its lengthwise adjustment, and an indicator or finger 60, the lower end of which is secured to a portion of the toe head which does not move with the toe wiper assembly during its lengthwise adjustment but which does move with the toe wiper assembly during its heightwise adjustment. The scale 58 is graduated in shoe size units and, as illustrated, the scale is marked from 4 to 10 in children's sizes. The relative adjustment of the scale 58 and the indicator 60 lengthwise of a supported upper is such that when the indicator points to a given shoe size, for example to 7½, as shown in Fig. 4, a 7½ upper will fit accurately within the space enclosed by the wipers, provided the toe wipers 40 are fully retracted, as shown in Fig. 4, and the heel wipers and shank wipers are in their partially advanced position illustrated in Fig. 4 and hereinbefore referred to. The illustrated positions of the wiper plates are the positions in which they are normally arranged at the end of a cycle of operations and consequently no preliminary adjustment of the wipers is necessary in order to arrange them for the reception of an upper. In the illustrated machine the finger 60 is part of a plate which is secured to the back of the toe head 59 (Fig. 5) and arranged to extend outwardly from the machine, then upwardly with an inclination rearwardly of a supported upper (Fig. 2). At a point slightly above the elevation of the scale 58 the finger 60 is bent inwardly over the toe head and provided with a pointed end which is positioned to register with the scale.

After the toe head has been adjusted relatively to the heel head to accommodate the size of shoe to be operated upon, and after the wiper plates have been arranged as illustrated in Fig. 4, a prewelted upper is arranged in inverted position within the opening enclosed by the wiper plates with its welt positioned upon said plates in order to support the upper for the reception of a last. It has been found that the depression of a last into the supported upper tends to force the upper downwardly and draw the welt off the wiper plates. In order to counteract this tendency, there is provided in the illustrated machine a series of fingers at the heel end of a supported upper and another series of fingers at the toe end of a supported upper, each of which operates to press the upper against the wiper plates in order to cause the plates to be positioned within the welt crease.

Referring now to the series of fingers at the heel end of the upper (Figs. 2, 7 and 8), this series comprises a pair of units 62, each of which is provided with a plurality of downwardly extending fingers 64 constructed and arranged to engage the adjacent edge faces of the welt and upper at opposite sides of the heel seat. A third unit 66 of said series of fingers is provided with a plurality of downwardly extending fingers 68 (Fig. 7) constructed and arranged to engage the adjacent edge faces of the welt and upper at the back of the heel seat. The finger units 62 are secured by screws 70 to opposite sides of a lever 72 (Fig. 7) which is supported upon a carrier or arm 74 secured to a pivot pin 76, said pin being journaled in lugs 78 extending upwardly from the heel head 61. The finger unit 66 is positioned between the finger units 62 and secured by screws 80 to a surface of the lever 72 which surface faces the toe end of the supported upper and is offset forwardly from the body of the lever in order to locate the unit 66 in such relation to the heel end of a supported upper that the fingers 68 are arranged for engagement with the adjacent edge faces of the welt and upper. The lever 72 is pivoted to the forward end of the arm 74 by means of a pin 82 which extends transversely through the lever 72 and through a lug 84 extending upwardly from the arm 74 which lug is positioned within a groove 86 formed in the lever 72 and arranged to extend longitudinally thereof. The lever 72 is held from transverse movement relatively to the arm 74 by the engagement of the lug 84 within the groove 86, and the arm 74 is held from transverse movement relatively to the heel head by the lugs 78 (Fig. 8) which engage opposite sides of the arm. The lever 72 is normally positioned as shown in Fig. 2 in which position the lever has been swung in a clockwise direction from its position in Fig. 7, and the finger assembly, as it enters a supported upper will, therefore, be advanced somewhat toward the toe head and consequently there is no danger of the fingers 68 of the unit 66 engaging the supported upper as the finger assembly is brought into operative position. The lever 72 is held in its normal position by a compression spring 88 which is positioned within a lengthwise bore 90 in the arm 74, the forward end of said spring being seated against a stud 92 (Fig. 13) threaded to the lever 72 and extending into the groove 86 formed in the lever. In order to prevent disengagement of the spring 88 from the stud 92, the stud is provided with a reduced end portion 94 which engages within the end of the spring 88. The clockwise movement of the lever 72 by the spring 88 is limited by the engagement of an arm 95 (Fig. 8) secured to the lever 72 with a pin 97 in the arm 74. In order to hold the lever 72 at the limit of its counterclockwise movement as shown in Fig. 7, an arm 96 is secured to the lever 72 and extends rearwardly therefrom in order to position its lower end face for engagement with a button 98 which is pivoted to the arm 74 and movable to and from the position illustrated in Fig. 8 wherein the button 98 underlies the arm 96 and prevents clockwise movement of the lever 72 by the spring 88. The arm 74 together with the lever 72 and the finger units are normally held in retracted position, as shown in Fig. 2, by a spring 100, one end of which engages an arm 102 secured to the pivot pin 76 and extending downwardly therefrom and the other end of which engages a pin in the heel head 61. The finger assembly is swung from its position in Fig. 2 to its position in Fig. 7 by the depression of a treadle 104 (Fig. 5). The connections between the treadle 104 and the finger assembly comprise a link 106 pivoted to the treadle and arranged to engage the lower end of a vertical slide 108 (Fig. 2) which in turn engages the horizontal arm of a bell crank lever 110 pivoted to the base of the heel head, which lever operates through a link 112 and a slide 114 to swing a crossbar 116 in the direction indicated by the arrow in Fig. 3 thereby imparting a like motion to a slide 118 which engages the end of the arm 102 of the finger assembly and swings the finger assembly in a counterclockwise direction as seen in Fig. 2. The actuation of the finger assembly by the treadle 104 is limited by a stop herein illustrated as a screw 122 (Fig. 7) extending upwardly from the heel head for engagement with the under surface of the arm 74 which surface, at its point of engagement with the screw 122, is vertically offset in order to provide sufficient space for said screw between the arm 74 and the heel head. The treadle 104 is retained in its depressed position by a latching mechanism comprising a ratchet plate 123 (Fig. 5) secured to an arcuate edge face of the treadle 104 which face is arranged in concentric relation to the fulcrum of the treadle, and a pawl 125 pivoted to the machine frame and arranged for engagement with the ratchet teeth 123. The pawl 125 is released to permit the return of the finger assembly to its inoperative position by the actuation of a tripping tail 127 formed integrally with the pawl.

In order to press the welt at the heel end of a supported upper against the heel wiper plates 42, fingers 124 are formed integrally with the fingers 64 and 68 and arranged substantially at right angles thereto and in substantially parallel relation to the heel wiper plates when the finger assembly is in its operative position, as shown in Fig. 7. In the illustrated machine, the fingers 124 and the fingers 64 and 68 are arranged alternately in their respective finger units (Fig. 8). The ends of the fingers 124 are bent upwardly slightly in order to prevent them from digging into the welt as the finger assembly is brought into operative position by the depression of the treadle 104.

In order that the finger units 62 which engage the inside of the upper at opposite sides of its heel end may operate to spread the upper and thereby to press the upper outwardly against the wiping edges of the supporting heel wiper plates 42, said finger units are flexible and are arranged to extend from their supporting lever 72 forwardly of a supported upper and in divergent relation to each other, as shown in Fig. 8, the distance between the free ends of the finger units, in their normal position, being somewhat greater than the width of the heel end of the supported upper. In order that the fingers 64 may enter the heel end of the supported upper during the depression of the arm 74, cams or fingers 126 are secured to each of the finger units 62 and arranged to extend outwardly therefrom and a pair of rolls 128 (Fig. 1) are pivotally mounted in brackets 130 secured to the heel head and positioned to be engaged by the fingers 126 during the depression of the finger assembly. The relative arrangement of the rolls 128 and the cam fingers 126 heightwise of a supported upper is such that the fingers 64 are sprung inwardly as they approach the supported upper and spring outwardly again by their own resiliency just before they come to the limit of their downward movement. As the fingers 64 spring outwardly, they engage the adjacent edge faces of the welt and upper thereby spreading the heel seat portion of the upper and causing the heel wiper plates 42 to engage within the welt crease of the upper. The fingers 64 maintain this arrangement of the upper and the wiper plates during the introduction of a last into the supported upper thereby preventing the welt from being drawn downwardly off the wiper plates by the frictional engagement of the last with the upper as it is pressed downwardly thereinto.

The forepart of a supported upper is held in position for the reception of a last by gripping means which engage the lasting allowance of the forepart of the upper, said gripping means comprising the toe wiper plates 40 and a series of fingers (Fig. 9) arranged to have their upper gripping ends positioned within the forepart of a supported upper. In the illustrated machine, said series of fingers comprises a pair of finger units 132 secured to the opposite arms of a U-shaped portion of a finger carrier 134. When the fingers are in their operative position with their gripping ends positioned within the forepart of a supported upper, the finger carrier is substantially horizontal as shown in Fig. 9, its exact position being determined by the engagement of a stop screw 135, threaded to the shank portion of the carrier, with the upper surface of the toe head. The finger carrier is held in operative position by a latch 137 secured to the toe head 59 and arranged to engage the upper surface of the U-shaped portion of the carrier. Each of the finger units 132 comprises a plurality of fingers 136, said fingers, when in operative position, as shown in Fig. 9, extending downwardly into the supported upper at the sides of the forepart. The ends of the fingers 136 are curved outwardly for engagement with the inner surface of the supported upper, said curved ends when in operative position preferably being arranged in the plane of the toe wiper plates 40. Another finger unit 138 is secured to the finger carrier 134 at the base of the U-shaped portion of the carrier for engagement with a supported upper at its toe end. The finger unit 138 is provided with a plurality of fingers 140 which are preferably arranged when in operative position with their curved ends in the plane of the toe wiper plates. In order to permit the fingers to move as a unit lengthwise of a supported upper, the finger carrier 134 has a pin and slot connection with lugs 142 (Fig. 17) extending upwardly from the toe head. The finger carrier 134 is yieldingly held at the limit of its movement forwardly of a supported upper by a spring 144, one end of which engages a hook 146 extending upwardly from the carrier and the other end of which engages a screw in the toe head. The movement of the carrier 134 forwardly of the supported upper brings the fingers 140 into engagement with the inside of the supported upper, as shown in Fig. 19. The spring 144, in addition to pulling the finger assembly forwardly of the supported upper, operates to hold the finger assembly in its inoperative position (Fig. 2). The fingers 136 and 140 are individually yieldingly movable outwardly of the supported upper in order to press the upper against the wiping edges of the supporting wiper plates. The fingers 136 and 140 are individually adjustable by means of screws 148 (Fig. 10) threaded to the finger carrier 134 and arranged to engage the outer faces of the shank portions of the fingers. Thus, it will be seen that the arrangement of the fingers may be varied to suit different sizes and styles of shoes.

In order to position the forepart of the supported upper heightwise thereof in predetermined relation to the toe wiper plates 40, each of said fingers is provided with a welt engaging finger 150, said welt engaging finger when in operative position being arranged in substantially parallel relation to the plane of the toe wiper plates. As best shown in Figs. 17, 18 and 19, the welt engaging fingers 150 engage the welt of a supported upper as the finger assembly is swung downwardly into operative position. At that stage of the operation which is shown in Fig. 17, the welt of the supported upper extends downwardly anad outwardly of the supported upper from the seam 152, and it is desirable to flatten the welt somewhat in order that no more than the required width of lasting allowance may be provided between the last bottom (Fig. 21) and the welt. The desired flattening of the welt is effected by the welt engaging fingers 150 as the finger assembly moves downwardly from its position in Fig. 17 to its position in Fig. 18 wherein the welted margin of the upper is shown in its predetermined heightwise position. In Fig. 19 the fingers 136 and 140 and the toe wiper plates are engaging opposite sides of the supported upper. It will be seen that a measured amount of the upper material projects upwardly from the point where the upper is gripped and provides a portion of the lasting allowance of the upper.

The forepart of the upper being supported upon the toe wiper plates 40 and held in position by the upper engaging fingers 136 and 140 and the welt engaging fingers 150, as shown in Fig. 19, and the heel end of the upper being positioned upon the heel wiper plates 42 and held in position by the fingers 64 and 68, the supported upper is now ready for the reception of a last. In order to support the heel end of the last within the supported upper, there is provided, in the illustrated machine, a heel post 154 (Fig. 13) which is slidably mounted in a bracket 156 extending upwardly from the base of the heel head and a spring 158 is coiled about the heel post between the bracket 156 and the head 160 of said post. In order to provide clearance for the insertion of the heel end of the last into the heel end of the upper, the heel post 154 is drawn downwardly prior to the insertion of the last by the depression of a treadle 162 (Fig. 5) which, as it nears the limit of its depression, imparts downward movement to a link 164 (Fig. 2) which is pivoted at its upper end to a slide 165 movable heightwise of the machine upon screws 166 and provided at its upper end with fingers 168 arranged to engage a cross bar 169 (Fig. 13) secured to the lower end of the heel post. The illustrated construction and arrangement of the slide 165 is such that the slide offers no obstruction to movement of the heel post 154 rearwardly of the supported shoe with the heel head. For reasons to be explained, it is desirable to provide a lost motion between the treadle 162 and the link 164 and, accordingly, the link 164 is arranged to extend through a hole 170 in the treadle 162 and a pair of nuts 172 are threaded to the end of the link 164, said nuts providing the point of engagement of the treadle 162 with the link. After the last has been introduced into the supported upper, the treadle 162 is permitted to return to its initial position thereby releasing the spring 158 and permitting the heel post to be pressed upwardly against the cone of the inverted last. Upward movement of the last by the expansion of the spring 158 is limited by a stop 174 (Fig. 13) which is secured by the clamping screws 80 to the lever 72 upon which the finger units 62 and 66 are mounted. Preferably the stop 174 is slotted for the reception of the screws 80 in order to permit an adjustment of the stop heightwise of the supported upper. The adjustment of the stop serves to measure the vertical distance between the heel wiper plates 42 and the heel seat face of the last thereby measuring the lasting allowance of the heel portion of the upper and determining the extent to which the welt is carried in over the last bottom.

The toe end of the last at this stage of the operation is supported by the fingers 140 at the toe end of the upper (Fig. 20). In order to depress the forepart of the last into the forepart of the supported upper, a depressor 178 is swung downwardly from its position in Fig. 9 and brought to bear against the bottom of the inverted last. The depressor 178, as illustrated in Fig. 9, is substantially similar to the depressor illustrated and described in my co-pending application hereinbefore referred to. This depressor is suitable for pressing into a supported upper a last which is not provided with an insole. If, however, an insole is mounted on the last bottom, it is preferable to provide a depressor having pivoted thereto one of the two alternative insole engaging devices illustrated in Fig. 26 and Fig. 29, respectively, and hereinafter described. The actuation of the depressor presses the last against the shank portions of the fingers 136 and 140 (Fig. 12) which extend downwardly and converge inwardly from the carrier 134 into position to be engaged by the last during its depression into the upper. The fingers 136 and 140 serve to guide the forepart of the last during its depression into the upper, and the forepart of the last, during its depression, moves the ends of the fingers outwardly of the supported upper thereby spreading the forepart of the upper for the reception of the last and pressing the fingers against the inside of the upper. The pressure of the fingers against the inside of the upper causes the upper to be gripped between the fingers and the toe wiper plates 40 (Fig. 20). The inclination of the fingers 140 rearwardly of the supported upper, as shown in Fig. 20, causes the last to move rearwardly of the upper as it is depressed thereinto thereby pressing the heel end of the last against the heel end of the upper and stretching the upper lengthwise thereof. The rearward movement of the last is opposed by a pad 180 (Fig. 13) which is secured to the heel head and constructed and arranged to receive the heel end of the supported upper. In the illustrated machine, the heel pad 180 consists of a rubber member faced with leather, the rubber member being of sufficient thickness and resiliency to permit the last to move rearwardly of the supported upper to the extent required by the inclination of the toe fingers 140. As illustrated in Fig. 9, the depressor 178 is pivoted, together with the finger carrier 134, to the lugs 142 extending upwardly from the toe head and is provided with an arm 182 to permit manual actuation thereof. The depressor is held from movement laterally of the toe head by the engagement of its downwardly extending arms 179 with the lugs 142. The movement of the depressor 178 is arrested by a stop 184 (Fig. 9) in the form of a screw threaded into the shank portion of the finger carrier 134. The adjustment of the stop screw 184 determines the vertical distance between the plane of the ends of the fingers 136 and 140 and the plane in which the forepart of the last bottom is positioned after the depression of the last has been completed. The adjustment of the stop screw 184 also determines the vertical distance from the plane in which the forepart of the last bottom is finally located upwardly to the plane of the welt engaging fingers 150 thereby determining or measuring the width of the lasting allowance of the supported upper.

The depression of the forepart of the last into the supported upper positions the forepart of the upper upon a resilient lasting bag or apron 188 (Figs. 6 and 13). The depression of the forepart of the last into the supported upper does not cause the lasting bag to be stretched about the upper since the lasting bag is initially positioned far enough below the supported upper to prevent it from interfering with the positioning of the forepart of the upper upon the toe wipers. Stretching of the lasting bag about the forepart of the upper is effected, however, by vertical movement of the toe supporting assembly by the sole laying treadle, as hereinafter described. In the illustrated machine the lasting bag 188 is supported upon the upstanding portions of a pair of brackets 190 which are secured to the upper end of a toe post 192. The marginal portions of the lasting bag are turned downwardly and secured to the brackets 190 by clamping screws 194. The toe post 192 and its associated mechanism is substantially the same as the toe supporting means disclosed in United States Letters Patent No. 1,373,482, granted April 5, 1921, on an application of Matthias Brock, which may be consulted for a detailed description of this mechanism. Briefly described, said mechanism comprises a member 196 which is slidably mounted in the toe head for movement lengthwise of a supported upper and is provided with a bearing within which the toe post is arranged to slide vertically. The toe post rests on a support 198 carried by a vertical slide 200 which, in the illustrated machine, is supported upon the machine frame by lugs 202 which are formed integrally with the slide. The support 198 is adjustable heightwise of the slide 200 by turning the handle 201. In the illustrated machine, the toe post 192 is held against axial movement by a screw 204 threaded into the member 196 and arranged to engage the toe post within a longitudinal groove 206 formed therein.

After the last has been depressed into the supported upper, the toe wiper plates 40 are advanced into the position shown in Fig. 22 and the shank and heel wiper units are advanced into the position shown in Fig. 14, whereupon both the heel finger assembly and the toe finger assembly are returned to their respective inoperative positions. The last and upper are now held between the wiper plates and the shoe supports (Fig. 23). The wiper plates are now actuated again to lay the lasting allowance over upon the last bottom (Fig. 24) and are held in advanced position while an outsole which has been treated with adhesive is secured to the shoe bottom.

The outsole is pressed against the bottom of the supported shoe by a presser plate, for example the presser plate 208 shown in Fig. 1, the under surface of which has the general outline and contour of a last bottom and has secured thereto a resilient rubber pad 210. The presser plate is fulcrumed at one end of a horizontal presser arm 212. The presser arm is slidably mounted in a carrier herein illustrated as a swinging bracket 214, the hub of which is sleeved on a vertically movable post 216 (Fig. 5). For the purpose of facilitating the accurate presentation of the presser plate 208 to and its withdrawal from the sole, the hub of the bracket 214 is provided with a spiral slot 224 which takes a stud 222 extending outwardly from the post 216 and arranged to lower and raise the presser arm 212 automatically as it is swung toward and from operative position. The bracket 214 is yieldingly held at the limit of its counterclockwise movement as seen in Fig. 1 by a spring 218, one end of which is secured to the bracket 214 and the other end of which is secured to the machine frame. The presser arm 212 is normally held withdrawn as shown in Fig. 1 by a spring 220 connecting the arm 212 to the bracket 214. The sole-laying mechanism is actuated by the treadle 162 which is employed earlier in the cycle of operations to lower the heel post. The treadle is connected to the post 216 by a link 228 (Fig. 5). The treadle is associated with a locking bar 230 and a pawl 231 which is connected to a lifting rod 232 movable by a knee lever 233. The treadle is unlatched after the sole-laying operation by a slight rearward movement of a knee pad 235 secured to the upper end of the knee lever 233 which operates to disengage the pawl 231 from the locking bar 230 and to permit the return of the treadle to its initial position by a spring 234. The elevation of the treadle lifts the presser plate 208, thereby disengaging it from the shoe bottom and permitting it to be returned to its normal position as shown in Fig. 1 by the springs 218 and 220.

It will be remembered that the sole-laying treadle 162 is employed earlier in the operation to draw the heel post 154 downwardly in order to provide sufficient clearance for the insertion of the heel end of the last into the heel end of the upper. During this actuation of the treadle 162, the presser plate 208 remains in the position shown in Fig. 1, in which position it is free to move downwardly without engaging any part of the machine. The depression of the treadle 162 in the course of the sole-laying operation does not carry the treadle downwardly far enough to cause it to take up all of the lost motion provided between the treadle 162 and the nuts 172 on the link 164 which connects the treadle to the heel post 154 and consequently the heel post is not disturbed during the sole-laying operation.

In order to prevent any considerable movement of the forepart of the shoe downwardly relatively to the wiper plates under the pressure of the sole laying pad, means is provided for yieldingly moving the toe post upwardly during the depression of the sole-laying pad. The upward movement of the toe post is effected by the depression of the treadle 162 which operates, through a link 236 (Fig. 5), a rocker arm 238 (Fig. 6) pivoted to the machine frame beneath the slide 200, and a link 240 connecting the rocker arm to the slide 200, to lift the entire toe supporting assembly. In order to provide a lost motion of the link 236 relatively to the rocker arm 238, a pin and slot connection is provided between the upper end of the link 236 and the rocker arm. The extent of the lost motion may be varied by adjusting a turn buckle 242 in the link 236. The provision of lost motion in the connections from the treadle 162 to the toe supporting assembly insures that the upward pressure against the shoe will be less than the downward pressure of the sole-laying pad against the outsole and consequently the pressure of the outsole against the welt (which is positively supported by the wipers) will be greater than the pressure of the outsole against the filler and thus a secure bond will be insured between the welt and outsole where it is most needed.

The preferred method of making pre-welted shoes in accordance with the present invention is as follows:

The operator grasps the heel end of an inverted upper by its welt, turns the welt upwardly and outwardly from the upper and positions it upon the heel wiper plates 42, first gauging the position of the back seam 244 of the upper by the adjacent corners of the heel wiper plates (Fig. 11). The welt at the forepart of the upper is then turned upwardly and outwardly and positioned upon the toe wiper plates 40, the toe head 59 having first been adjusted horizontally relatively to the heel head 61 for the reception of the particular size of shoe to be operated upon. The treadle 104 is then depressed in order to swing the heel finger assembly from its position in Fig. 2 to a position wherein the fingers 64 and 68 are positioned within the heel end of the supported upper. The operator then grasps the handle 246 of the lever 72 and swings the lever counterclockwise into the position shown in Fig. 7, bringing the fingers 64 and 68 into engagement with the adjacent edge faces of the welt and upper. The locking button 98 is then swung under the arm 96 (Fig. 8) in order to lock the finger assembly in upper engaging position. The operator then grasps the handle 248 of the toe finger assembly, which at this time is in the position illustrated in Fig. 2, and swings the fingers downwardly into the supported upper. The welt engaging fingers 150 engage the edge of the welt as the finger assembly is swung downwardly into operative position, pressing the welt against the toe wipers and flattening it somewhat as shown in Figs. 17 and 18. The finger assembly is then moved toward the wipers 40, carrying the finger assembly from its position in Fig. 18 to its position in Fig. 19 wherein the lasting allowance of the toe end of the upper is engaged between the curved ends of the fingers 140 and the wiping edges of the toe wiper plates. The heel post 154 is then drawn downwardly by depressing the treadle 162 and the heel end of the last is positioned within the heel end of the supported upper. In the operation now being described a bare last with no insole on its bottom is employed. It is to be understood, however, that the present invention contemplates the provision of means for handling a last having an insole, or an insole and a filler, positioned on its bottom, and accordingly there is hereinafter described means for depressing into a supported upper a last provided with an insole and a filler. In order to facilitate the insertion of the last the heel wipers and shank wipers are preferably retracted somewhat from their normal position. After the introduction of the heel end of the last into the upper, the heel post is released, whereupon the spring 158 presses the heel post upwardly against the cone of the inverted last bringing the heel end of the last into the position indicated in Fig. 12. The depressor 178 is then actuated to press the forepart of the last into the forepart of the supported upper. The toe wiper plates 40 are then advanced from their fully retracted position, as shown in Fig. 21, to the position indicated in Fig. 22 and the heel and shank wiper units are advanced to the position indicated in Fig. 14, whereupon both finger assemblies and the depressor 178 are returned to their respective initial positions, leaving the last held at the toe end between the rubber apron 188 and the toe wiper plates 40 (Fig. 23) and at the heel end between the heel post 154 and the heel wiper plates 42. The wiper plates are then again advanced to lay the lasting allowance over upon the last bottom (Fig. 24). A filler (not shown) is then placed on the last bottom within the space enclosed by the welt. The shoe is now ready to receive an outsole such, for example, as the outsole 306 illustrated in Fig. 15. Preferably the outsole is initially attached to the shoe bottom by adhesive in order to hold it in position for the outsole stitching operation. The adhesion may be effected in any known manner.

For example, latex adhesive may have been applied to the outsole and permitted to become tacky and latex adhesive or rubber cement may have been applied to the welt and the filler before presenting the upper to the machine. While the shoe is supported upon the wiper plates in overwiped condition with the treated filler in position upon the last bottom, the treated outsole is placed on the shoe bottom and the sole-laying presser plate 208 is swung into operative position and depressed against the shoe bottom by the operation of the treadle 162. If a stronger bond is desired than is afforded by the use of latex adhesive and rubber cement, pyroxylin cement may be employed with satisfactory results. The usual method of uniting an outsole to a shoe bottom by means of pyroxylin cement consists in applying the cement to both of the surfaces to be united and permitting it to dry before the upper is presented to the machine. After the shoe has been lasted, an activator, for example, a pyroxylin solvent such as acetone, is applied to either of the cemented surfaces and immediately thereafter the outsole is placed in position upon the shoe bottom and pressure is applied thereto. If pyroxylin cement is used a sufficient bond may be created to hold the upper to the shoe bottom without the aid of stitching, although the outsole may be stitched if desired.

After the sole-laying operation the presser plate 208 is released by a slight movement of the knee pad 235. The wiper plates are then fully retracted, whereupon the shoe is lifted by the rubber apron 188 and the spring 158 which supports the heel post, thereby locating the shoe somewhat above the elevation of the wiper plates in convenient position to be grasped by the operator and removed from the machine. After the removal of the shoe the operator permits the return of the heel and shank wipers to their normal positions by the spring 49 (Fig. 4a), whereupon the machine is set for a repetition of the cycle of operations.

The operation above described may be somewhat facilitated by conditioning or arranging the welt for the reception of an outsole before the pre-welted upper is presented to the machine. Such conditioning or arranging of the welt may consist in tempering the welt, for example, by wetting it, or it may consist in operating upon the welt, for example, by beating it out flat in order to prepare it for the reception of an outsole. When the welt is thus prepared for the operation of the illustrated machine the welt may readily be arranged flat on the wiper plates in position to receive an outsole as illustrated in Fig. 32. In order to hold the welt flat against the wiper plates it is desirable that the finger assembly be so adjusted relatively to the wiper plates that the welt engaging fingers 150, when in operative position, are positioned above the wiper plates to the extent of the thickness of the welt. This arrangement of the welt engaging fingers to the toe wiper plates, as shown in Fig. 32, is effected by adjusting the stop screw 135 mounted in the finger carrier 134 in order to increase the range of movement of the finger carrier. It should be noted that the stop screw 184 which arrests the downward movement of the last depressor is mounted in the finger carrier and its operative vertical position is, therefore, varied by the adjustment of the stop screw 135. Thus, it will be seen that any adjustment of the stop screw 135 virtually effects a like adjustment of the stop screw 184 and, consequently, the stop screw 135 may be adjusted to accommodate the welt engaging fingers 150 to varying arrangements of the welt of a supported upper relatively to the wiper plates without disturbing the heightwise relation of the depressed last to the finger assembly. Consequently the adjustment of the stop screw 135 does not vary the vertical distance between the plane of the welt engaging fingers 150 and the plane of the forepart of the last bottom and therefore the measurement of the lasting allowance is not affected by said adjustment, although the lasting allowance, as shown in Fig. 32, is located entirely below the wiper plates rather than partly above and partly below the wiper plates as shown in Fig. 21. Recapitulating, it may be broadly stated that the welt engaging fingers 150 may be adjusted heightwise of a supported upper without disturbing the measurement of the lasting allowance.

In Fig. 32 there is illustrated an alternative construction of the finger carrier 134 wherein the finger carrier is pivoted to the lugs 142 but has no movement lengthwise of the supported upper to bring the fingers 140 into engagement with the inner surface of the supported upper, the pin and slot connection of the carrier 144 to the lugs 142 illustrated in Fig. 17 having been omitted in the alternative construction illustrated in Fig. 32 wherein a hole is provided in the finger carrier 134 in place of the slot shown in Fig. 17. In the alternative construction the fingers 140, as they enter the supported upper, are spaced therefrom and remain so spaced until they are engaged by the toe end of the last in the course of its depression into the supported upper. The last as it is depressed exerts a cam action against the fingers 140, swinging them toward the wiper plates and causing the supported upper to be gripped between the fingers and the wiping edges of the wiper plates.

Referring now to the alternative presser members illustrated in Figs. 25 to 30, there is shown in Fig. 25 a presser member in the form of a plate 252 which has the general outline of the forepart of the supported upper and is adapted to press against a last having an insole positioned on its bottom. In order that the force of the downward movement of the depressor 178 may be imparted to the marginal portion of an insole 256 (Fig. 27), the presser plate is provided with a downwardly extending peripheral flange 254 which, as shown in Fig. 27, is arranged to bear against that portion of the insole 256 which extends beyond the edge face of the filler 257. The presser plate 252 is suspended upon the depressor arm by means of a pin 258 slidably mounted in a hole 260 extending lengthwise through the crosshead 262 (Fig. 25) formed in the end of the depressor arm, and extending through a bearing formed by an upwardly curved portion 263 (Fig. 26) of a plate 264 secured to the upper surface of the presser plate and arranged to fit within an open end slot in the crosshead (Fig. 28). The depressor arm has secured to its upper edge face one end of a leaf spring 266 which has secured to its free end a U-shaped gripper member 268 (Fig. 25). The spring 266 extends forwardly and downwardly from the depressor arm in order to position the gripper member 268 to embrace the upwardly bent portion 269 of the plate 264 and thereby to hold the rear end of the presser plate 252 elevated as the depressor arm is swung to bring the presser plate into engagement with an insole positioned upon a last, the toe end of which is supported as shown in Fig. 20. The presser plate is held at an angle to the depressor arm such that the plate engages the insole in substantially parallel relation thereto. During the continued downward movement of the depressor arm after the presser plate has engaged the insole, the leaf spring 266 yields to permit the insole engaging plate to swing slightly upon its pivot in order to maintain its parallel relation to the insole. In order that the presser plate 252 may be detached from the depressor arm to permit substitution of another presser plate of different size or shape, the pivot pin 258 is arranged to be withdrawn from the hole 260 sufficiently to disengage it from its bearing in the plate 264. The pin 258 is yieldingly held in position to support the presser plate, as shown in Fig. 28, by a leaf spring 270 secured to the side of the depressor arm and having its free end bifurcated, as shown in Fig. 26, and arranged for engagement with a rectangular shank portion of the pin 258 between heads 272 and 274 formed therein.

The presser member illustrated in Fig. 29 is especially adapted for use in operating upon pre-welted shoes provided with very thin insoles, for example, the insole 276 illustrated in Fig. 30. This presser member consists of a plate 278 which has the general outline of the forepart of a shoe bottom, and a series of flexible fingers 280 which, as shown in Fig. 30, are secured to the marginal portion at the toe end and sides of the plate 278 and arranged to extend downwardly therefrom with a slight outward inclination. At their lower ends the fingers 280 are bent outwardly in order to provide presser feet 282 arranged to engage the marginal portion of the insole 276 in substantially parallel relation thereto, as shown in Fig. 30. The position of the presser feet 282 upon the insole 276 is determined by the last guiding fingers 136 which are engaged by the presser feet as they move downwardly from their position as indicated by dotted lines in Fig. 30 into insole-engaging position. The last guiding fingers, in turn, are positioned by their engagement with the wiping edges of the toe wiper plates 40 and consequently have their free ends arranged substantially in horizontal alinement with the periphery of the shoe bottom. Thus, it will be seen that the fingers 280 as they move downwardly into operative position arrange themselves in a predetermined relation to the insole, as shown in Fig. 30, regardless of the size or shape of the shoe which is being operated upon. The fingers 280 adjust themselves automatically to all shoes within a run of sizes, said fingers springing inwardly in the plane of the presser feet 282 as required to allow for various widths of shoes. The insole-engaging fingers, by maintaining a constant pressure against the insole as the last approaches the limit of its depression into the upper, hold the margin of the insole against the last bottom, thereby preventing the last guiding fingers from lifting the margin of the insole and injuring it. As the last is depressed into the supported upper, the angle of the last bottom to the horizontal changes somewhat, thereby causing the presser assembly to swing slightly about a pivotal connection with the depressor arm. Unless the pivotal connection of the presser assembly with the depressor arm is located as near as possible to the last bottom when the presser assembly is in operative position thereon, there will be a component movement of the presser feet 282 lengthwise of the last bottom which might injure the margin of the insole. It is therefore desirable that the depressor arm be pivoted to the presser assembly at a point between the presser plate 278 and the plane of the presser feet 282 and preferably as near the plane of the presser feet as the construction of the presser assembly will permit. In the illustrated machine the depressor arm is pivoted to a U-shaped bracket 286 which is slidably mounted within guideways formed in the side walls of an opening 288 in the plate 278 and secured to the plate by means of screws 290 threaded into tapped holes in the plate and arranged to engage within open-end slots 292 provided in outwardly extending lugs 294 in the bracket 286. The lugs 294 fit between heads 296 and 298 of the screws 290 and, thus, it will be seen that the heightwise relation of the bracket 286 to the presser assembly may be varied by adjusting the screws 290. A depressor arm 300 is pivoted within the U-shaped bracket 286 near its base. The construction and arrangement of this depressor arm is substantially the same as the construction and arrangement of the depressor arm 178. It will be noted, however, that the crosshead 302 of the depressor arm 300 is made somewhat shorter than the crosshead of the depressor arm 178 in order to cause it to fit within the U-shaped bracket 286. The bracket engages the filler 257 after the presser feet 282 of the fingers 280 have engaged the margin of the insole, said bracket affording a positive limit of the downward movement of the depressor relatively to the shoe bottom. In order that the desired pressure of the fingers 280 against the insole 276 may be obtained regardless of the thickness of the filler 257, the bracket 286 is slidably mounted in the plate 278, as above described, and is adjustable relatively to the plate by turning the screws 290.

In Fig. 31 there is illustrated the relative positions of the fingers 280 and the shoe parts at the end of the first advancing movement of the toe wiper plates 40. At this stage of the operation, the ends of the last guiding fingers overlie the presser feet 282 of the fingers 280 and, consequently, while the last guiding fingers have advanced sufficiently to permit the wipers to be brought inwardly over the edge of the insole, the fingers 280 have advanced but slightly from their position in Fig. 30 and there is still sufficient clearance between the fingers 280 and the edge face of the filler 257 to insure that the filler 257 will not be injured by a pressure of the fingers 280 against it. In order to prevent the last guiding fingers from advancing over the presser feet 282 sufficiently to lock the depressor assembly in shoe bottom engaging position the fingers 280 are bent inwardly slightly near their lower ends, as shown in Fig. 31.

The operation of the illustrated machine hereinbefore described in its application to the manufacture of pre-welted shoes without insoles applies equally well to the manufacture of pre-welted shoes with insoles provided the depressor 178 is replaced by a depressor provided with suitable insole-engaging means. The operation in its application to the manufacture of pre-welted shoes with insoles may, however, have an additional step, namely the application of adhesive to the edge face of the filler and to the adjacent marginal surface of the insole and also to the faces of the welt and upper to be brought into engagement with the filler and insole (Fig. 33). The desired adhesion may be effected in any known manner. For example, pyroxylin cement may have been applied to the parts to be united and permitted to dry before presenting the upper to the machine and, after the preliminary advance of the wipers from their initial position to the position illustrated in Fig. 33, an activator may be applied to one of the cemented surfaces, whereupon the wiper plates are again advanced to unite the cemented surfaces and to hold them so united, as shown in Fig. 34, until the cement has created a bond between the treated surfaces.

Having thus described my invention what I claim as new and desire to secure by Letters Patent of the United States is:

1. That method of lasting pre-welted shoes which comprises supporting a pre-welted upper, drawing the supported upper lengthwise thereof, and pressing a last into the upper while the upper is held in drawn condition.

2. That method of lasting a pre-welted shoe which comprises gripping the upper along a line adjacent to the seam uniting the welt and upper, and pressing a last into the upper while the upper is gripped.

3. That method of manufacturing shoes which consists in positioning a plurality of gripper fingers within an upper, moving a last heightwise of the upper into sliding engagement with the fingers and thereby bringing the fingers into gripping engagement with the upper, forcing the last into the upper while the upper is gripped by the fingers, and arresting the last in predetermined heightwise relation to the upper thereby determining the width of the upper margin extending above the last bottom.

4. That method of manufacturing pre-welted shoes which comprises supporting a pre-welted upper by its welt upon the wipers of a bed lasting machine, drawing the heel end of the upper rearwardly thereof against the heel wipers, drawing the toe end of the upper forwardly thereof against the toe wipers, and pressing a last into the upper while the upper is supported upon the wipers.

5. That method of manufacturing pre-welted shoes which comprises adjusting the toe head of a bed lasting machine toward or from the heel head thereby to position it to receive pre-welted uppers of the size to be operated upon, supporting a pre-welted upper of such size by its welt upon the wipers of the machine, drawing the heel end of the upper rearwardly thereof against the heel wipers, drawing the toe end of the upper forwardly thereof against the toe wipers, and pressing a last into the upper while the upper is supported upon the wipers.

6. That method of manufacturing pre-welted shoes which comprises supporting a pre-welted upper by its welt upon wipers of a bed lasting machine, pressing the welted margin of the upper against the wipers in order to cause the wipers to enter the welt crease, and then introducing a last into the upper.

7. That method of manufacturing pre-welted shoes which comprises supporting an end of a pre-welted upper by its welt upon wipers of a bed lasting machine, pressing the welted margin of the upper against the wipers in order to cause the wipers to enter the welt crease, and then pressing a last into the upper.

8. That method of manufacturing pre-welted shoes which comprises supporting a pre-welted upper in inverted position, positioning the heel end of a last in the heel end of the upper, pressing the heel end of the last upwardly to a predetermined limit, and then swinging the last in a plane extending lengthwise and heightwise thereof in order to position the toe end of the last within the upper.

9. That method of manufacturing pre-welted shoes which comprises supporting a pre-welted upper off its last in inverted position, moving the heel end of a last downwardly and rearwardly into the heel end of the upper, and then moving the toe end of the last downwardly to a predetermined limit in order to position it in the toe end of the upper.

10. That method of manufacturing pre-welted shoes which comprises supporting a pre-welted upper in inverted position, moving the heel end of a last downwardly and rearwardly into the heel end of the upper, then pressing the heel end of the last upwardly to a predetermined limit, and finally pressing the toe end of the last downwardly to a predetermined limit in order to position it in the toe end of the upper.

11. That method of manufacturing pre-welted shoes which comprises supporting a pre-welted upper in inverted position, moving the heel end of a last downwardly and rearwardly into the heel end of the upper, then pressing the toe end of the last downwardly, and simultaneously moving the last rearwardly of the upper in order to stretch the upper lengthwise thereof.

12. That method of manufacturing pre-welted shoes which comprises supporting a pre-welted upper in inverted position, moving the heel end of a last downwardly and rearwardly into the heel end of the upper, and then pressing the toe end of the last downwardly to a predetermined limit in order to position the toe end of the last heightwise of the upper while simultaneously forcing the last rearwardly of the upper in order to stretch the upper lengthwise thereof.

13. That method of manufacturing pre-welted shoes which comprises supporting an inverted pre-welted upper by its welt upon the wipers of a bed lasting machine, positioning the heel end of a last in the heel end of the upper, moving the heel end of the last upwardly to a predetermined limit while the toe end of the last is held above the toe end of the upper, then swinging the last in a plane extending lengthwise and heightwise thereof in order to position the toe end of the last heightwise of the upper, and simultaneously forcing the last rearwardly of the upper in order to stretch the upper lengthwise thereof.

14. That method of manufacturing pre-welted shoes which comprises supporting a pre-welted upper by its welt upon the retracted wipers of a bed lasting machine, positioning the heel end of a last in the heel end of the upper, pressing the toe end of the last into the toe end of the upper while simultaneously stretching the upper lengthwise thereof, and then advancing the wipers in order to lay the welted margin of the upper over the last bottom and in order to position the welt for the reception of an outsole.

15. That method of manufacturing pre-welted shoes which comprises supporting a pre-welted upper by its welt upon the retracted wipers of a bed lasting machine, positioning the heel end of a last in the heel end of the upper, pressing the toe end of the last into the toe end of the upper while simultaneously stretching the upper lengthwise thereof, then advancing the wipers in order to lay the welted margin of the upper over the last bottom and in order to position the welt for the reception of an outsole, placing on the shoe bottom an outsole which has been treated with adhesive, and pressing the outsole against the shoe bottom while the welt is held so positioned.

16. That method of manufacturing pre-welted shoes which comprises supporting a pre-welted upper by its welt upon the retracted wipers of a bed lasting machine, positioning the heel end of a last in the heel end of the upper, pressing the toe end of the last into the toe end of the upper while simultaneously stretching the upper lengthwise thereof, then advancing the wipers in order to lay the welted margin of the upper over the last bottom and to position the welt for the reception of an outsole, pressing the outsole against the shoe bottom, and simultaneously pressing the last upwardly in order to press the shoe bottom against the outsole.

17. That method of manufacturing pre-welted shoes which comprises supporting a pre-welted upper, positioning the heel end of a last in the heel end of the upper, and then pressing the toe end of the last into the toe end of the upper while simultaneously stretching the upper lengthwise thereof.

18. That method of manufacturing pre-welted shoes which comprises supporting a pre-welted upper, positioning the heel end of a last in the end of the upper, and then pressing the toe end of the last into the toe end of the upper while simultaneously stretching the upper lengthwise thereof and also simultaneously guiding the toe end of the last during its movement into the toe end of the upper.

19. That method of manufacturing pre-welted shoes which comprises positioning the heel end of a last in the heel end of an upper, imparting relative movement to the toe end of the last and the toe end of the upper heightwise thereof in order to position the toe end of the last in the toe end of the upper, and simultaneously guiding said relative movement of the last and upper.

20. That method of manufacturing pre-welted shoes which comprises supporting a pre-welted upper by its welt upon the wipers of a bed lasting machine, and drawing the upper lengthwise thereof for the reception of a last.

21. That method of manufacturing pre-welted shoes which comprises supporting a pre-welted upper by its welt, drawing the upper lengthwise thereof for the reception of a last, and thereafter positioning a last within the upper.

22. That method of manufacturing pre-welted shoes which comprises supporting a pre-welted upper, drawing the upper lengthwise thereof for the reception of a last, and holding the upper in drawn condition while positioning a last therein.

23. That method of manufacturing pre-welted shoes which comprises holding the upper at its heel end from movement lengthwise thereof, drawing the toe end of the upper forwardly thereof for the reception of a last, and positioning a last within the upper.

24. That method of manufacturing pre-welted shoes which comprises holding the upper at its heel end from movement lengthwise thereof, drawing the toe end of the upper forwardly thereof in order to dispose the upper for the reception of a last, positioning the heel end of a last in the heel end of the upper, and then positioning the toe end of the last in the toe end of the upper.

25. That method of manufacturing pre-welted shoes which comprises completely lasting a pre-welted upper in a bed lasting machine, supporting the lasted pre-welted upper by its welt upon the advanced wipers of the machine, placing an outsole on the shoe bottom, and pressing the outsole against the shoe bottom while the wipers remain in advanced position.

26. That method of manufacturing pre-welted shoes which comprises supporting a lasted pre-welted shoe by its welt upon the advanced wipers of a bed lasting machine, placing an outsole on the shoe bottom, pressing the outsole against the shoe bottom and simultaneously pressing the last upwardly in order to press the shoe bottom against the outsole.

27. That method of manufacturing pre-welted shoes which comprises supporting a pre-welted upper by its welt upon the wipers of a bed lasting machine, pressing a last into the supported upper, advancing the wipers in order to overwipe the lasting allowance, and holding the wipers in advanced position while an outsole is secured to the shoe bottom.

28. That method of manufacturing pre-welted shoes which comprises supporting a pre-welted upper by its welt upon the wipers of a bed lasting machine, pressing a last into the supported upper, and locating the last in a predetermined position heightwise of the upper in order to measure a predetermined width of lasting allowance for the upper.

29. That method of manufacturing shoes which comprises supporting the heel end of an upper upon the wipers of a bed lasting machine, positioning the heel end of a last within the heel end of the upper, and locating the heel end of the last in a predetermined heightwise relation to the heel end of the upper in order to measure a width of lasting allowance at the heel end of the upper.

30. That method of lasting pre-welted shoes which comprises supporting a pre-welted upper, spreading the fore-part of the upper to facilitate the introduction of a last therein, and pressing a last into the upper while the fore-part of the upper is held outspread.

31. That method of lasting pre-welted shoes which comprises supporting a pre-welted upper, drawing the supported upper lengthwise thereof, drawing the supported upper width widthwise thereof, and pressing a last into the upper while the upper is held in drawn condition.

32. That method of manufacturing pre-welted shoes which comprises supporting a pre-welted upper by its welt upon the wipers of a bed lasting machine, positioning within the upper a last having a filler attached to its bottom, applying adhesive to the edge face of the filler and to the adjacent edge faces of the welt and upper, advancing the wipers in order to press the treated surfaces firmly together, and holding the wipers advanced until the adhesive has created a bond between the treated surfaces.

33. That method of manufacturing pre-welted shoes which comprises supporting a pre-welted upper by its welt upon the wipers of a bed lasting machine, positioning within the upper a last having a filler attached to its bottom, applying pyroxylin cement to the edge face of the filler and to the adjacent edge faces of the welt and upper, advancing the wipers in order to press the treated surfaces firmly together, and holding the wipers advanced until the cement has created a bond between the treated surfaces.

34. That method of manufacturing pre-welted shoes which comprises supporting a pre-welted upper by its welt upon the wipers of a bed lasting machine, positioning within the upper a last having an insole and a filler attached to its bottom, applying adhesive to the edge face of the filler and to the adjacent marginal surface of the insole, applying adhesive to the edge faces of the welt and upper and to the inner surface of the lasting allowance, advancing the wipers in order to press the treated surfaces firmly together, and holding the wipers advanced until the adhesive has created a bond between the treated surfaces.

35. That method of manufacturing pre-welted shoes which comprises supporting a lasted pre-welted shoe in inverted position, pressing an outsole against the shoe bottom, positively opposing the pressure of the outsole against the welt, and yieldingly opposing the pressure of the outsole against the portion of the shoe bottom enclosed by the welt.

36. That method of manufacturing pre-welted shoes which comprises supporting a pre-welted upper by its welt upon the wipers of a bed-lasting machine, yieldingly supporting a last within the upper, lasting the upper, laying an outsole on the lasted upper, imparting a downward pressure to the outsole, and imparting to the last an upward pressure less than the downward pressure upon the outsole.

37. That method of manufacturing pre-welted shoes which comprises arranging the toe wiper plates of a bed lasting machine in fully retracted position, advancing the heel wiper plates a predetermined amount from their fully retracted position, supporting the toe end of a pre-welted upper by its welt upon the fully retracted toe wipers, supporting the heel end of the upper by its welt upon the advanced heel wipers, positioning a last in the supported upper, and wiping the welted margin of the supported upper over upon the shoe bottom.

38. In a machine for making pre-welted shoes, means for guiding a last during its introduction into an upper comprising guides constructed and arranged to engage the side and end portions of the forepart of the last.

39. In a machine for making pre-welted shoes, means for guiding a last during its introduction into an upper comprising fingers constructed and arranged to engage the side and end portions of the forepart of the last.

40. In a machine for making pre-welted shoes, means for guiding a last during its insertion into an upper comprising guides so constructed and arranged that they are engaged by the side and end faces of the forepart of the last during its depression into the upper while the free ends of the guides engage the inner surface of the forepart of the upper.

41. In a machine for making pre-welted shoes, means for guiding a last during its insertion into an upper comprising guides so constructed and arranged that they are engaged by the side and end faces of the forepart of the last during its depression into the upper and thereby brought into engagement with the adjacent edge faces of the welt and upper.

42. In a machine for making pre-welted shoes, means for supporting a pre-welted upper in inverted position, and means arranged to extend upwardly from a supported upper for guiding a last during its introduction into the upper.

43. In a machine for making pre-welted shoes, supports for a pre-welted upper, and means for guiding a last during its introduction into the supported upper, said guiding means being arranged to engage the inner surface of the upper and to extend heightwise of the upper.

44. In a machine for making pre-welted shoes, supports for a pre-welted upper, and means for guiding the forepart of a last during its introduction into the supported upper, said guiding means being arranged to engage the inner surface of the forepart of the upper and to extend heightwise of the upper.

45. In a machine for making pre-welted shoes, means for supporting a pre-welted upper, and means for guiding a last during its introduction into the supported upper, said guiding means extending heightwise of the upper from the inner surface of its lasting allowance.

46. In a machine for making pre-welted shoes, wiper plates arranged to support a pre-welted upper, and means for guiding a last during its introduction into the supported upper, said last guiding means extending heightwise of the upper from the inner surface of its lasting allowance.

47. In a machine for making pre-welted shoes, supports for a pre-welted upper, and means for guiding a last during its introduction into the supported upper comprising fingers arranged to extend heightwise of the upper.

48. In a machine for making pre-welted shoes, means for supporting a pre-welted upper, and means for guiding the forepart of a last during its introduction into the forepart of the supported upper comprising fingers arranged to extend heightwise of the forepart of the upper.

49. In a machine for making pre-welted shoes, wiper plates arranged to support a pre-welted upper, and means for guiding a last during its introduction into the supported upper comprising fingers arranged to extend heightwise of the upper from its inner surface.

50. In a machine for making pre-welted shoes, supports for a pre-welted upper, and means for guiding a last during its introduction into the supported upper comprising fingers arranged to extend heightwise of the upper from the inner surface of its lasting allowance.

51. In a machine for making pre-welted shoes, wiper plates arranged to support the forepart of a pre-welted upper, and means for guiding the forepart of a last during its introduction into the supported upper, said last guiding means being arranged to extend heightwise of the forepart of the upper from its inner surface.

52. In a machine for making pre-welted shoes, supports for a pre-welted upper, and means extending heightwise of the supported upper from the inner edge face of its welt constructed and arranged to guide a last during its introduction into the upper.

53. In a machine for making pre-welted shoes, supports for a pre-welted upper, and fingers extending heightwise of the supported upper from the inner edge face of the welt constructed and arranged to guide a last during its introduction into the upper.

54. In a machine for making shoes, grippers constructed and arranged to be moved by engagement of a last therewith in the course of its depression into an upper into gripping engagement with the margin of the upper, said gripping engagement of the grippers with the upper being maintained until the last comes to the limit of its depression.

55. In a machine for making shoes, a plurality of movable grippers constructed and arranged for engagement with the inner surface of the margin of an upper and arranged to be moved outwardly into gripping engagement with the upper by a relative movement of the grippers and the upper effected by movement of a last relatively to the upper.

56. In a machine for making pre-welted shoes, grippers constructed and arranged to be actuated by the depression of a last into a pre-welted upper to grip the upper by its lasting allowance.

57. In a machine for making pre-welted shoes, means for supporting a pre-welted upper by its welt, and means constructed and arranged to be actuated by the depression of a last into the supported upper to press the upper against its supporting means in order to grip the upper by its lasting allowance.

58. In a machine for making pre-welted shoes, supports for a pre-welted upper, and grippers constructed and arranged to be actuated by the depression of a last into the supported upper to grip the upper and to hold it gripped during the depression of the last.

59. In a machine for making pre-welted shoes, fingers constructed and arranged for engagement with the inner surface of a pre-welted upper and arranged to be actuated to spread the upper for the reception of a last.

60. In a machine for making pre-welted shoes, fingers constructed and arranged for engagement with the inner surface of a pre-welted upper and arranged to be actuated by the depression of a last into the upper to spread the upper for the reception of the last.

61. In a machine for making pre-welted shoes, means for supporting a pre-welted upper by its welt, a depressor for pressing a last into the supported upper, and means arranged to be actuated by the depression of the last into the upper to spread the upper for the reception of the last.

62. In a machine for making pre-welted shoes, means for supporting a pre-welted upper, and means extending heightwise of the forepart of a pre-welted upper from the inner edge face of the welt constructed and arranged to guide a last during its introduction into the upper.

63. In a machine for making pre-welted shoes, means for gripping the forepart of a pre-welted upper by its lasting allowance comprising a series of fingers and cooperating forepart lasting wiper plates arranged in opposition to said fingers.

64. In a machine for making pre-welted shoes, means for supporting a pre-welted upper, and grippers constructed and arranged to be actuated by the depression of the forepart of a last into the supported upper to grip the forepart of the upper by its lasting allowance.

65. In a machine for making pre-welted shoes, fingers constructed and arranged for engagement with the inner surface of the forepart of a pre-welted upper and arranged to move outwardly of the upper in order to spread the upper for the reception of a last.

66. In a machine for making pre-welted shoes, fingers constructed and arranged for engagement with the inner surface of the forepart of a pre-welted upper and arranged to be moved outwardly of the upper by the depression of a last into the upper in order to spread the upper for the reception of the last.

67. In a machine for making pre-welted shoes, means for supporting the forepart of a pre-welted upper by its welt, a depressor for pressing a last into the upper, and means actuated by the depression of the last to spread the forepart of the upper for the reception of the last.

68. In a machine for making pre-welted shoes, wiper plates arranged to support a pre-welted upper by its welt, and means constructed and arranged to be actuated by the depression of a last into the supported upper to press the upper against its supporting means in order to grip the upper by its lasting allowance.

69. In a machine for making pre-welted shoes, wiper plates for supporting a pre-welted upper by its welt, a depressor for pressing a last into the supported upper, and means arranged to be actuated by the depression of the last into the upper to spread the upper for the reception of the last.

70. In a machine for lasting shoes, means for gripping an upper comprising plates and a plurality of fingers arranged in opposition to the inner edges of the plates and positioned within the upper.

71. In a machine for lasting shoes, means for gripping an upper comprising wiper plates and a plurality of fingers arranged for movement heightwise of the upper to position them within the upper and opposite to the inner edges of the wiper plates.

72. In a machine for lasting shoes, means for gripping an upper comprising wiper plates and a plurality of fingers constructed and arranged to co-operate with the wiper plates to grip the upper therebetween, said fingers being arranged to be actuated by the depression of a last into the upper.

73. In a machine for lasting shoes, means for gripping an upper by its lasting allowance comprising wiper plates and a plurality of fingers constructed and arranged to co-operate with the wiper plates to grip the lasting allowance therebetween, said fingers being movable outwardly of the upper by the depression of a last into the upper in order to cause the lasting allowance to be gripped between the fingers and the wiper plates.

74. In a machine for lasting shoes, means for gripping an upper by its lasting allowance comprising wiper plates and a plurality of fingers constructed and arranged to co-operate with the wiper plates to grip the lasting allowance therebetween, said fingers being movable outwardly of the upper by the depression of a last into the upper in order to cause the lasting allowance to be gripped between the fingers and the wiper plates during the depression of the last into the upper.

75. In a machine for making pre-welted shoes, plates for supporting a pre-welted upper by its welt, and means constructed and arranged to engage the inside of the upper and to press the upper against the supporting plates.

76. In a machine for making pre-welted shoes, plates for supporting a pre-welted upper by its welt, and means arranged to be actuated by the depression of a last into the upper to engage the inside of the upper and to press the upper against the supporting plates.

77. In a machine for making pre-welted shoes, plates constructed and arranged to support a pre-welted upper by its welt, and a plurality of fingers constructed and arranged to be positioned within the upper and arranged to move outwardly of the upper in order to press the upper against the upper supporting plates.

78. In a machine for making pre-welted shoes, plates for supporting a pre-welted upper by its welt, and a plurality of fingers arranged to move into the supported upper, said fingers being constructed and arranged to be actuated by the depression of a last into the upper to press the upper against the supporting plates.

79. In a machine for making pre-welted shoes, plates for supporting a pre-welted upper by its welt, and a plurality of fingers arranged to move into the supported upper, said fingers being constructed and arranged to be actuated by the depression of a last into the upper to press the upper against the supporting plates and to hold the upper against the supporting plates during the depression of the last.

80. In a machine for making pre-welted shoes, plates for supporting a pre-welted upper by its welt, and a plurality of fingers arranged to move heightwise of the upper to position them therein and arranged to move outwardly of the upper in order to cause the upper to be engaged between the fingers and the supporting plates.

81. In a machine for making pre-welted shoes, plates for supporting a pre-welted upper by its welt, and a plurality of fingers arranged to move into the upper and having their free ends bent outwardly of the upper, said fingers being arranged to move outwardly of the upper in order to cause the upper to be engaged between the fingers and the supporting plates.

82. In a machine for making pre-welted shoes, plates for supporting a pre-welted upper by its welt, and a series of fingers arranged to move into the upper having their free ends bent outwardly of the upper, said series of fingers being arranged to move as a unit lengthwise of the upper and arranged to move individually outwardly of the upper in order to cause the upper to be engaged between the end faces of the fingers and the edge faces of the plates.

83. In a machine for making pre-welted shoes, plates for supporting a pre-welted upper by its welt, and a plurality of members arranged to move heightwise of the upper in order to position them therein and arranged to move lengthwise of the upper in order to press the upper against the plates and thereby to cause the plates to be positioned within the welt crease.

84. In a machine for making pre-welted shoes, plates for supporting a pre-welted upper by its welt, a plurality of members arranged to move heightwise of the upper in order to position them therein and arranged to move lengthwise of the upper in order to press the upper against the plates and thereby to cause the plates to be positioned within the welt crease, and means for locking the fingers in upper-pressing position.

85. In a machine for making pre-welted shoes, plates for supporting a pre-welted upper by its welt, and a series of fingers arranged to move heightwise of the upper about an axis extending transversely of the upper in order to position them within the upper and arranged to move lengthwise of the upper about another axis extending transversely of the upper in order to press the upper against the plates and thereby to cause the plates to be positioned within the welt crease.

86. In a machine for making pre-welted shoes, plates for supporting a pre-welted upper by its welt, a series of fingers arranged to move heightwise of the upper about an axis extending transversely of the upper in order to position them within the upper and arranged to move lengthwise of the upper about another axis extending transversely of the upper in order to press the upper against the plates and thereby to cause the plates to be positioned within the welt crease, and means for holding the fingers in upper-pressing position.

87. In a machine for making pre-welted shoes, means for supporting a pre-welted upper by its welt, a series of fingers arranged to move heightwise of the upper in order to position them within the upper, and means for moving said fingers inwardly of the upper during their heightwise movement in order to cause the fingers to clear the welted margin of the upper.

88. In a machine for making pre-welted shoes, wiper plates for supporting a pre-welted upper by its welt, and means constructed and arranged to engage the inside of the upper and press the upper against the wiping edges of the supporting wiper plates.

89. In a machine for making pre-welted shoes, wiper plates for supporting a pre-welted upper by its welt, means actuated by the depression of a last into the upper to engage the inside of the upper and to press the upper outwardly against the wiping edges of the supporting wiper plates, and means for advancing and closing the wipers.

90. In a machine for making pre-welted shoes, wiper plates constructed and arranged to support a pre-welted upper by its welt, a plurality of fingers constructed and arranged to be positioned within the upper and arranged to move outwardly of the upper in order to press the upper against the wiping edges of the supporting wiper plates, and means for advancing and closing the wipers.

91. In a machine for making pre-welted shoes, wiper plates for supporting a pre-welted upper by its welt, a plurality of members arranged to move heightwise of the upper in order to position said members within the upper and arranged to move lengthwise of the upper in order to press the upper against the wiper plates and thereby to cause the plates to be positioned within the welt crease, and means for advancing and closing the wipers.

92. In a machine for making pre-welted shoes, wiper plates for supporting the heel end of a pre-welted upper by its welt, a plurality of members arranged to move heightwise of the heel end of a supported upper in order to position said members within the upper and arranged to move lengthwise of the upper in order to press the upper against the wiper plates and thereby to cause the plates to be positioned within the welt crease, and means for locking the fingers in upper-pressing position.

93. In a machine for making pre-welted shoes, wiper plates for supporting a pre-welted upper by its welt, means for pressing the welt of a supported upper against the wiper plates, and means constructed and arranged to engage the inside of the upper and to press the upper against the wiping edges of the supporting wiper plates.

94. In a machine for making pre-welted shoes, wiper plates for supporting a pre-welted upper by its welt, a series of fingers constructed and arranged to be positioned in parallel relation to the wiper plates and arranged for movement heightwise of a supported upper in order to press the welt of a supported upper against the wiper plates, and means constructed and arranged to engage the inside of the upper and to press the upper against the wiping edges of the supporting wiper plates.

95. In a machine for making pre-welted shoes, wiper plates for supporting a pre-welted upper by its welt, means for pressing the welt of a supported upper against the wiper plates, means constructed and arranged to engage the inside of the upper and to press the upper against the wiping edges of the supporting wiper plates, and means 96. In a machine for making pre-welted shoes, wiper plates for supporting a pre-welted upper by its welt, a series of welt engaging fingers constructed and arranged to be positioned in parallel relation to the wiper plates and arranged for movement heightwise of a supported upper in order to press the welt of a supported upper against the wiper plates, and a series of upper engaging fingers constructed and arranged to engage the inside of the upper and arranged for movement lengthwise of a supported upper in order to press the upper against the wiping edges of the supporting wiper plates.

97. In a machine for making pre-welted shoes, wiper plates for supporting a pre-welted upper by its welt, a series of welt engaging fingers constructed and arranged to be positioned in parallel relation to the wiper plates and arranged for movement heightwise of a supported upper in order to press the welt of a supported upper against the wiper plates, and a series of upper engaging fingers formed integrally with the first-mentioned series of fingers and constructed and arranged to engage the inside of the upper and arranged for movement lengthwise of a supported upper in order to press the upper against the wiping edges of the supporting wiper plates.

98. In a machine for making pre-welted shoes, wiper plates for supporting a pre-welted upper by its welt, a series of welt engaging fingers constructed and arranged to be positioned in parallel relation to the wiper plates, a series of upper engaging fingers formed integrally with the welt engaging fingers and constructed and arranged to engage the adjacent edge faces of a supported welt and upper, and a member to which the fingers are secured, said member being arranged for movement to press the upper engaging fingers against the supported upper in order to press the upper against the wiping edges of the supporting wiper plates, said member also being arranged for movement to press the welt engaging fingers against the welt of the supported upper.

99. In a machine for making pre-welted shoes, wiper plates for supporting a pre-welted upper by its welt, a series of welt engaging fingers constructed and arranged to be positioned in parallel relation to the wiper plates, a series of upper engaging fingers formed integrally with the first-mentioned series and constructed and arranged to engage the adjacent edge faces of a supported welt and upper, a lever to which the fingers are secured, said lever being arranged for movement to press the upper engaging fingers against the supported upper in order to press the upper against the wiping edges of the supporting wiper plates, a carrier upon which the lever is mounted, said carrier being arranged for movement to press the welt engaging fingers against the welt of the supported upper, a stop for limiting the advancing movement of the carrier, means for locking the lever to the carrier, and means for holding the carrier in stop-engaging position.

100. In a machine for making pre-welted shoes, wiper plates for supporting a pre-welted upper by its welt, a series of welt engaging fingers constructed and arranged to be positioned in parallel relation to the wiper plates, a series of upper engaging fingers formed integrally with the first-mentioned series and constructed and arranged to engage the adjacent edge faces of a supported welt and upper, a lever to which the fingers are secured, said lever being arranged for movement to press the upper engaging fingers against the supported upper in order to press the upper against the wiping edges of the supporting wiper plates, a carrier upon which the lever is mounted, said carrier being arranged for movement to press the welt engaging fingers against the welt of the supported upper, and a stop secured to the lever and arranged to engage the bottom of a last positioned in the supported upper in order to locate the last heightwise of the upper.

101. In a machine for making pre-welted shoes, means for supporting a pre-welted upper, grippers arranged to engage the forepart of the upper, a depressor for pressing the forepart of a last into the forepart of the supported upper, and means for causing the last to move rearwardly of the upper during its depression in order to stretch the upper lengthwise thereof.

102. In a machine for making pre-welted shoes, means for supporting a pre-welted upper, a depressor for pressing the forepart of a last into the forepart of the supported upper, means actuated by the depression of the last to grip the forepart of the upper, and means for causing the last to move rearwardly of the upper during its depression in order to stretch the upper lengthwise thereof.

103. In a machine for making pre-welted shoes, means for supporting a pre-welted upper by its welt, a depressor for pressing the forepart of a last into the forepart of a supported upper, and members constructed and arranged to guide the forepart of the last during its depression, said members being constructed and arranged to be actuated by the depression of the last to clamp the upper against its supporting means.

104. In a machine for making pre-welted shoes, means for supporting a pre-welted upper by its welt, a depressor for pressing the forepart of a last into the forepart of a supported upper, and members constructed and arranged to guide the forepart of the last during its depression and to cause the last to move rearwardly of the upper during its depression, said members being constructed and arranged to be actuated by the depression of the last to clamp the upper against its supporting means.

105. In a machine for making pre-welted shoes, plates for supporting a pre-welted upper by its welt, a depressor for pressing the forepart of a last into the forepart of a supported upper, and a series of fingers constructed and arranged to guide the forepart of the last during its depression and to cause the last to move rearwardly of the upper during its depression in order to stretch the upper lengthwise thereof.

106. In a machine for making pre-welted shoes, plates for supporting a pre-welted upper by its welt, a depressor for pressing the forepart of a last into the forepart of a supported upper, and fingers constructed and arranged to be actuated by the engagement of the forepart of the last therewith during its depression to clamp the upper against its supporting plates.

107. In a machine for making pre-welted shoes, plates for supporting a pre-welted upper by its welt, a depressor for pressing the forepart of a last into the forepart of an upper supported by said plates, and fingers constructed and arranged to be actuated by the engagement of the forepart of the last therewith during its depression to clamp the upper against its supporting plates, said fingers being constructed and arranged to guide the forepart of the last during its depression into the supported upper.

108. In a machine for making pre-welted shoes, plates for supporting a pre-welted upper by its welt, a depressor for pressing the forepart of a last into the forepart of an upper supported by said plates, and fingers constructed and arranged to clamp the lasting allowance of the forepart of the upper against the upper-supporting plates, said fingers being so arranged that clamping pressure is imparted thereto by the engagement of the last therewith during its depression into the upper, said fingers also being arranged to cause the last to move rearwardly of the upper during its depression.

109. In a machine for making pre-welted shoes, plates for supporting a pre-welted upper by its welt, a depressor for pressing the forepart of a last into the forepart of the supported upper, and means constructed and arranged both to guide the forepart of the last during its depression and to cause the last to move rearwardly of the upper during its depression, said means comprising a series of fingers and a carrier for said fingers arranged for movement to carry the fingers into and out of last guiding position, said fingers, when in said position, inclining downwardly and inwardly from the carrier and having their free ends positioned within the upper.

110. In a machine for making pre-welted shoes, plates for supporting a pre-welted upper by its welt, a depressor for pressing the forepart of a last into the forepart of the supported upper, means constructed and arranged both to guide the forepart of the last during its depression and to cause the last to move rearwardly of the upper during its depression, said means comprising a series of fingers and a carrier for said fingers arranged for movement to carry the fingers into and out of last guiding position, said fingers, when in said position, being inclined downwardly and inwardly from the carrier and having their free ends positioned within the upper, and means for securing the finger assembly in operative position.

111. In a machine for making pre-welted shoes, grippers constructed and arranged to engage the forepart of a pre-welted upper off its last, and means for positioning the upper heightwise thereof relatively to the grippers.

112. In a machine for making pre-welted shoes, means for supporting a pre-welted upper by its welt, means for clamping the upper against the support, and means for positioning the upper heightwise thereof relatively to the supporting means and the clamping means.

113. In a machine for making pre-welted shoes, means for supporting a pre-welted upper by its welt, fingers for clamping the upper against the support, and means for locating the upper heightwise in a predetermined position relatively to the supporting means and the clamping fingers.

114. In a machine for making pre-welted shoes, means for supporting the forepart of a pre-welted upper by its welt, means for clamping the forepart of the upper against the support, and means for positioning the upper heightwise thereof relatively to the supporting means and the clamping means.

115. In a machine for making pre-welted shoes, plates for supporting a pre-welted upper by its welt, a series of fingers for clamping the upper against the supporting plates, said fingers being arranged to move into and out of operative position heightwise of the upper, means for determining the operative position of said fingers heightwise of the upper, and means for positioning the upper heightwise thereof relatively to the supporting plates.

116. In a machine for making pre-welted shoes, plates for supporting a pre-welted upper by its welt, a series of fingers for clamping the upper against the supporting plates, said fingers being arranged to move into and out of operative position heightwise of the upper, means for determining the operative position of said fingers heightwise of the upper, and gages for positioning the upper heightwise thereof relatively to the clamping fingers and the supporting plates.

117. In a machine for making pre-welted shoes, plates for supporting a pre-welted upper by its welt, a series of fingers for clamping the upper against the supporting plates, said fingers being arranged to move into and out of operative position heightwise of the upper, means for determining the operative position of said fingers heightwise of the upper, and a series of fingers for positioning the upper heightwise thereof relatively to the supporting plates.

118. In a machine for making pre-welted shoes, plates for supporting a pre-welted upper by its welt, a series of fingers for clamping the upper against the supporting plates, said fingers being arranged to move into and out of operative position heightwise of the upper, means for determining the operative position of said fingers heightwise of the upper, and a series of fingers formed integrally with the clamping fingers for positioning the upper heightwise thereof relatively to the supporting plates.

119. In a machine for making pre-welted shoes, plates for supporting a pre-welted upper by its welt, a series of fingers for clamping the upper against the supporting plates, said fingers being arranged to move into and out of operative position heightwise of the upper, means for determining the operative position of said fingers heightwise of the upper and a series of fingers formed integrally with the clamping fingers and arranged in predetermined relation to said clamping fingers heightwise thereof for positioning the upper heightwise thereof relatively to the clamping fingers and the supporting plates.

120. In a machine for making pre-welted shoes, plates for supporting a pre-welted upper by its welt, a series of fingers for clamping the upper against the supporting plates, said fingers being arranged to move into and out of operative position heightwise of the upper, means for determining the operative position of said fingers heightwise of the upper, and a series of welt engaging fingers formed integrally with the clamping fingers and arranged in predetermined relation to said clamping fingers heightwise thereof for positioning the upper heightwise thereof relatively to the clamping fingers and the supporting plates.

121. In a bed lasting machine, wiper plates for supporting a pre-welted upper by its welt, a series of fingers for clamping the upper against the supporting plates, said fingers being arranged to move into and out of operative position heightwise of the upper, means for determining the operative position of said fingers heightwise of the upper, and a series of welt engaging fingers formed integrally with the clamping fingers and arranged in predetermined relation to said clamping fingers heightwise thereof for positioning the upper heightwise thereof relatively to the clamping fingers and the supporting plates.

122. In a machine for making pre-welted shoes, means for supporting a pre-welted upper, means for clamping the upper against its support comprising a series of fingers and a carrier therefor arranged for movement to advance the fingers into and to withdraw the fingers from clamping position, and means for arresting the advancing movement of the carrier in order to locate the fingers, heightwise thereof, in predetermined relation to the upper supporting means.

123. In a machine for making pre-welted shoes, means for supporting a pre-welted upper, means for clamping the upper against its support comprising a series of fingers and a carrier therefor which is arranged for movement to advance the fingers into and to withdraw the fingers from clamping position, and a stop for arresting the advancing movement of the carrier in order to locate the fingers, heightwise thereof, in predetermined relation to the upper supporting means.

124. In a machine for making pre-welted shoes, means for supporting a pre-welted upper, and means for clamping the upper against the support comprising a series of fingers and a carrier for said fingers arranged to move lengthwise of the supported upper in order to cause the upper to be engaged between the fingers and the upper supporting means.

125. In a machine for making pre-welted shoes, means for supporting a pre-welted upper, means for clamping the upper against the support comprising a series of fingers, a carrier for said fingers arranged to move lengthwise of the supported upper in order to cause the upper to be engaged between the fingers and the upper supporting means, and yielding means for holding the fingers in upper engaging position.

126. In a machine for making pre-welted shoes, means for supporting a pre-welted upper, a series of fingers for clamping the upper against its supporting means, and means for individual adjustment of said fingers substantially in a plane common to their free ends.

127. In a machine for making pre-welted shoes, supports for a pre-welted upper, a series of fingers for clamping the upper against its supports, a carrier for said fingers, and means for individual adjustment of said fingers substantially in a plane common to their free ends comprising abutment screws mounted in the finger carrier and arranged to engage respectively the outer surfaces of the shank portions of said fingers.

128. In a machine for making pre-welted shoes, means for supporting a pre-welted upper, means for clamping the upper against the support comprising a series of fingers, a carrier for said fingers arranged to move lengthwise of a supported upper in order to cause the upper to be engaged between the fingers and the upper supporting means, and yielding means arranged to act on the carrier to hold the clamping fingers in engagement with the upper.

129. In a machine for making pre-welted shoes, means for gripping a supported upper comprising wiper plates and a series of fingers, said plates and fingers being located at opposite sides of the supported upper and arranged for relative movement to grip the upper therebetween.

130. In a machine for making pre-welted shoes, means for gripping a supported upper including a series of fingers constructed and arranged for movement heightwise of the upper and for movement outwardly of the forepart of the upper in order to bring them into engagement therewith.

131. In a machine for making pre-welted shoes, means for gripping a supported upper including a series of fingers having their gripping surfaces positioned within the forepart of the upper and arranged to be moved outwardly of the upper into engagement therewith by the engagement of the forepart of a last with the shank portions of the fingers.

132. In a machine for making pre-welted shoes, means for gripping a supported upper comprising wiper plates and a series of fingers constructed and arranged to cooperate with said wiper plates to grip the upper therebetween, said fingers being arranged for movement into and out of operative position heightwise of the upper, means for determining the operative position of said fingers heightwise of the upper, and means for positioning the upper in predetermined heightwise relation to the grippers.

133. In a machine for making pre-welted shoes, means for gripping a supported upper comprising wiper plates and a series of fingers, said plates and fingers being arranged for relative movement to grip the upper therebetween, and a carrier for the fingers arranged for movement to advance the fingers into and to withdraw the fingers from a position wherein the gripping surfaces of the fingers are in the plane of the wiper plates.

134. In a machine for making pre-welted shoes, means for gripping a supported upper comprising wiper plates and a series of fingers, said plates and fingers being arranged for relative movement to grip the upper therebetween, a carrier for the fingers arranged for movement to advance the fingers into and to withdraw the fingers from a position wherein the gripping surfaces of the fingers are in the plane of the wiper plates, and means for arresting the advancing movement of the carrier.

135. In a machine for making pre-welted shoes, means for gripping a supported upper including a series of yielding fingers constructed and arranged to be moved outwardly of the upper in order to bring them into engagement therewith.

136. In a machine for making pre-welted shoes, means for gripping a supported upper including a series of flexible fingers having their gripping surfaces positioned within the upper, said fingers being arranged to be flexed outwardly of the upper by the engagement of a last therewith in order to bring their gripping surfaces into gripping engagement with the upper.

137. In a machine for making pre-welted shoes, means for gripping a supported upper comprising wiper plates and a series of flexible fingers constructed and arranged to be flexed outwardly of the upper in order to grip the upper between the fingers and the wiper plates, and a carrier for the fingers arranged for movement to advance the fingers into and to withdraw the fingers from a position wherein the gripping surfaces of the fingers are in the plane of the wiper plates.

138. In a machine for making pre-welted shoes, means for supporting the heel end of a last comprising a support movable heightwise of the last and means for pressing the support against the last, and manually actuated means for withdrawing the support comprising an actuator and linkage from the actuator to the support, said linkage being constructed and arranged to permeans for supporting a pre-welted upper, a depressor for pressing into the supported upper a last having an insole and a filler positioned on its bottom, a presser member pivoted to the depressor and arranged to engage the filler, a plate carried by the presser member and adjustable relatively thereto heightwise of the supported upper, a series of insole-engaging fingers carried by the plate, and a series of presser feet provided for the insole-engaging fingers, respectively.

157. In a machine for lasting pre-welted shoes, heel wipers, and shank wipers carried by the heel wipers and adjustable relatively to the heel wipers lengthwise and widthwise of a supported upper.

158. In a machine for lasting pre-welted shoes, heel wipers, shank wipers having tongue and groove connections with the heel wipers whereby said shank wipers are adjustable relatively to the heel wipers lengthwise and widthwise of a supported upper, and means for clamping the shank wipers to the heel wipers.

159. In a bed lasting machine for use in the manufacture of pre-welted shoes, means for supporting a pre-welted upper by its welt comprising end wipers and a pair of shank wipers constructed and arranged to be secured to one set of end wipers and to bridge the space between the end wipers lengthwise of the supported upper, and means for actuating the wipers to last the supported upper.

160. In a bed lasting machine, end wipers, shank wipers carried by the end wipers and adjustable relatively thereto longitudinally and transversely of the wipers, and means for clamping the shank wipers to the end wipers.

161. In a bed lasting machine, heel wipers, and shank wipers carried by the heel wipers and adjustable forwardly thereof in paths of unequal convergence relatively to the longitudinal median line of a supported shoe.

162. In a bed lasting machine for use in the manufacture of pre-welted shoes, means for supporting a pre-welted upper by its welt comprising toe wipers, heel wipers, and a pair of shank wipers constructed and arranged to be secured to the heel wipers, said shank wipers being adjustable in paths which converge forwardly of the supported upper, the lengthwise component of said adjustive movement serving to bring the shank wipers into operative relation to the shank portion of the supported upper and the widthwise component of the adjustive movement of the shank wipers serving to bring the wiping edges of the shank wipers into alinement with the wiping edges of the toe wipers.

163. In a bed lasting machine for use in the manufacture of pre-welted shoes, means for supporting a pre-welted upper by its welt comprising toe wipers, heel wipers, and a pair of shank wipers constructed and arranged to be secured to the heel wipers, said shank and heel wiper units extending forwardly of the supported upper beyond the rearward extremities of the toe wipers, said shank wipers being adjustable in paths which converge forwardly of the supported upper, the lengthwise component of said adjustive movement serving to bring the shank wipers into operative relation to the shank portion of the supported upper and the widthwise component of the adjustive movement of the shank wipers serving to bring the wiping edges of the shank wipers into alinement with the wiping edges of the toe wipers.

164. In a bed lasting machine for use in the manufacture of pre-welted shoes, means for supporting a pre-welted upper by its welt comprising toe wipers, heel wipers, means for varying the transverse adjustment of the heel wiper plates in their normal retracted position, and a pair of shank wipers constructed and arranged to be secured to the heel wipers, one of said shank wipers extending toward the toe end of the wiper assembly farther than the opposite wiper, said shank wipers being adjustable forwardly thereof in paths of unequal convergence relatively to the longitudinal median line of a supported shoe, the lengthwise component of said adjustive movement serving to locate the shank wipers opposite the shank portion of the supported upper and the widthwise component of the adjustive movement of the shank wipers serving to bring the wiping edges of the shank wipers into alinement with the wiping edges of the toe wipers, thereby compensating for the displacement of the shank wipers incidental to the adjustment of the heel wipers transversely thereof.

165. In a machine for making pre-welted shoes, a support for the toe end of a lasted shoe constructed and arranged for movement heightwise of the shoe, a sole laying pad, a treadle, and connections from the treadle to both the support and the pad whereby a force imparted to the treadle is distributed between the pad and the support.

166. In a bed lasting machine, a support for the toe end of a shoe constructed and arranged to move heightwise of the shoe, a sole laying pad, an actuator, and connections from the actuator to both the support and the pad whereby a force imparted to the actuator is distributed between the pad and the support, the connections from the actuator to the support being constructed and arranged to afford lost motion sufficient to delay the transmission of power from the actuator to the support while a preliminary pressure is transmitted from the actuator to the pad.

167. In a bed lasting machine for use in the manufacture of pre-welted shoes, means for laying a sole on a lasted pre-welted shoe comprising a sole laying pad, means for positively opposing the pressure of the pad against the margin of the sole comprising a plurality of wipers constructed and arranged to engage the upper within the welt crease, and a yielding work support for opposing the pressure of the pad against the portion of the shoe bottom enclosed by the welt.

168. In a bed lasting machine for use in the manufacture of pre-welted shoes, a treadle-actuated sole laying pad, connections between the treadle and the pad constructed and arranged to afford movement of the pad to and from sole laying position and to permit adjustment of the pad widthwise of the shoe and also axial adjustment of the pad about a horizontal axis extending transversely thereof, and a plurality of wipers constructed and arranged to engage the shoe within the welt crease in order positively to oppose the depression of the sole against the welt.

169. In a bed lasting machine for use in the manufacture of pre-welted shoes, a treadle-actuated sole laying pad, connections between the treadle and the pad constructed and arranged to afford movement of the pad to and from sole laying position and to permit adjustment of the pad widthwise of the shoe and also axial adjustment of the pad about a horizontal axis extending transversely thereof, a plurality of wipers mit horizontal movement of the support relatively thereto.

139. In a machine for making pre-welted shoes, means for supporting the heel end of a last comprising a support movable heightwise of the last and means for pressing the support against the last, and a stop arranged to engage the last.

140. In a machine for making pre-welted shoes, means for supporting the heel end of a last comprising a support movable heightwise of the last and means for pressing the support against the last, and a stop adjustable heightwise of a supported upper and arranged to engage the last in order to position the last heightwise of the upper.

141. In a machine for making pre-welted shoes, means for supporting the forepart of a pre-welted upper comprising wiper plates and a toe post, a lasting bag mounted on the toe post, a sole laying member, means for depressing the sole laying member, and connections from the sole laying means to the toe post for elevating the toe post in order to cause the lasting bag to be stretched about the forepart of the shoe.

142. In a machine for making pre-welted shoes, means for supporting a pre-welted upper, and a depressor for pressing into the supported upper a last having an insole positioned on its bottom, said depressor being constructed and arranged to apply pressure locally to the margin of the insole.

143. In a machine for making pre-welted shoes, means for supporting a pre-welted upper, and a depressor for pressing into the supported upper a last having an insole positioned on its bottom, said depressor being constructed and arranged to apply pressure locally to the margin of the insole a predetermined distance from its edge face.

144. In a machine for making pre-welted shoes, means for supporting a pre-welted upper, and a depressor for pressing into the supported upper a last having an insole positioned on its bottom, said depressor comprising an arm having pivoted thereto a presser constructed and arranged for engagement with the margin of the insole.

145. In a machine for making pre-welted shoes, means for supporting a pre-welted upper, and a depressor for pressing into the supported upper a last having an insole positioned on its bottom, said depressor having pivoted thereto a plate provided with a downwardly extending flange arranged to engage the margin of the insole.

146. In a machine for making pre-welted shoes, means for supporting a pre-welted upper, a depressor for pressing into the supported upper a last having an insole positioned on its bottom, a presser plate pivoted to the depressor, and yielding means for holding the plate at an angle to the depressor such that the plate engages the insole in substantially parallel relation thereto.

147. In a machine for making pre-welted shoes, means for supporting a pre-welted upper, a depressor for pressing into the supported upper a last having an insole positioned on its bottom, a presser plate detachably pivoted to the depressor, and yielding means for holding the plate at an angle to the depressor such that the plate engages the insole in substantially parallel relation thereto.

148. In a machine for making pre-welted shoes, means for supporting a pre-welted upper, and means for pressing into the supported upper a last having an insole positioned on its bottom, said pressing means comprising a series of fingers constructed and arranged to engage the margin of the insole.

149. In a machine for making pre-welted shoes, means for supporting a pre-welted upper, means for pressing into the supported upper a last having an insole positioned on its bottom, said pressing means including a series of fingers constructed and arranged to engage the margin of the insole, and guides constructed and arranged to be engaged by the fingers during their depression in order to adjust the fingers to register with the edge face of the insole.

150. In a machine for making pre-welted shoes, means for supporting a pre-welted upper, a depressor for pressing into the supported upper a last having an insole positioned on its bottom, and a series of presser fingers carried by the depressor and arranged to engage the margin of the insole.

151. In a machine for making pre-welted shoes, means for supporting a pre-welted upper, a depressor for pressing into the supported upper a last having an insole positioned on its bottom, a series of presser fingers carried by the depressor and arranged to engage the margin of the insole, and means for guiding the presser fingers during their depression in order to arrange them for engagement with the margin of the insole, said means comprising a series of guiding fingers arranged to extend divergently upward from the inner surface of the supported upper.

152. In a machine for making pre-welted shoes, means for supporting a pre-welted upper, a depressor for pressing into the supported upper a last having an insole positioned on its bottom, a series of presser fingers carried by the depressor and arranged to engage the margin of the insole, and a series of presser feet for the presser fingers, respectively.

153. In a machine for making pre-welted shoes, means for supporting a pre-welted upper, a series of fingers constructed and arranged to be positioned to engage the inner edge face of the welt and to extend divergently upwardly therefrom, a depressor for pressing into the supported upper a last having an insole positioned on its bottom, a series of insole-engaging fingers carried by the depressor, and a series of presser feet provided for said insole-engaging fingers, respectively, and arranged to engage said upwardly extending fingers during the depression of the last into the supported upper in order to position themselves for engagement with the margin of the insole.

154. In a machine for making pre-welted shoes, means for supporting a pre-welted upper, a depressor for pressing into the supported upper a last having an insole and a filler positioned on its bottom, a series of fingers carried by the depressor and arranged to engage the margin of the insole extending beyond the edge face of the filler, and a presser member carried by the depressor and arranged to engage the filler after the fingers have engaged the insole.

155. In a machine for making pre-welted shoes, means for supporting a pre-welted upper, a depressor for pressing into the supported upper a last having an insole and a filler positioned on its bottom, a series of fingers carried by the depressor and arranged to engage the margin of the insole extending beyond the edge face of the filler, and an unyielding presser member carried by the depressor and arranged to engage the filler after the fingers have engaged the insole, said presser member being adjustable heightwise of the supported upper relatively to the insole-engaging fingers.

156. In a machine for making pre-welted shoes, constructed and arranged to engage the shoe within the welt crease in order positively to oppose the depression of the sole against the welt, and yielding shoe supports for opposing the depression of the sole against the portion of the shoe bottom enclosed by the welt.

170. In a bed lasting machine for use in the manufacture of pre-welted shoes, a treadle-actuated sole laying pad, connections between the treadle and the pad comprising a vertical post, a carrier journaled thereon, a horizontal slide mounted in the carrier, the sole laying pad being supported at one end of the slide and arranged for pivotal movement about an axis extending longitudinally of the slide and transversely of the pad, and means for positively opposing the pressure of the pad against the margin of the sole comprising a plurality of wipers constructed and arranged to engage the upper within the welt crease.

KARL ENGEL.